(12) United States Patent
Benayad-Cherif et al.

(10) Patent No.: US 12,296,609 B2
(45) Date of Patent: May 13, 2025

(54) LASER MARKING THROUGH THE LENS OF AN IMAGE SCANNING SYSTEM

(71) Applicant: ALLTEC ANGEWANDTE LASERLICHT TECHNOLOGIE GMBH, Selmsdorf (DE)

(72) Inventors: Faycal Benayad-Cherif, Lexington, MA (US); Christopher Bahns, Westford, MA (US)

(73) Assignee: Alltec Angewandte Laserlicht Technologie GmbH, Selmsdorf (DE)

(*) Notice: Subject to any disclaimer, the term of this patent is extended or adjusted under 35 U.S.C. 154(b) by 400 days.

(21) Appl. No.: 16/761,718

(22) PCT Filed: Nov. 5, 2018

(86) PCT No.: PCT/US2018/059248
§ 371 (c)(1),
(2) Date: May 5, 2020

(87) PCT Pub. No.: WO2019/090245
PCT Pub. Date: May 9, 2019

(65) Prior Publication Data
US 2020/0338919 A1    Oct. 29, 2020

Related U.S. Application Data

(60) Provisional application No. 62/581,928, filed on Nov. 6, 2017.

(51) Int. Cl.
*B41M 5/24*     (2006.01)
*B23K 26/03*    (2006.01)
(Continued)

(52) U.S. Cl.
CPC ............. *B41M 5/24* (2013.01); *B23K 26/032* (2013.01); *B23K 26/082* (2015.10); *G06T 7/73* (2017.01)

(58) Field of Classification Search
CPC .......... B41M 5/24; B41M 5/26; B41M 5/267; B41M 5/262; B41M 5/00; G06T 7/73;
(Continued)

(56) References Cited

U.S. PATENT DOCUMENTS 8,000,831 B2 *   8/2011  Benayad-Cherif .. B23K 26/082
                                                   219/83
2010/0017012 A1  1/2010  Benayad-Cherif
(Continued)

FOREIGN PATENT DOCUMENTS

DE      10205562 C     7/2003
DE   102014205142 A1   9/2015
(Continued)

OTHER PUBLICATIONS

F-Series Fiber Lasers, 2017, Telesis, <http://www.telesis.com/pdf/Telesis_Fiber_Laser_CatalogFINAL-2017.pdf> (Year: 2017).*
(Continued)

*Primary Examiner* — Brian W Jennison
*Assistant Examiner* — Adam M Eckardt
(74) *Attorney, Agent, or Firm* — Buchanan Ingersoll & Rooney PC

(57) ABSTRACT

A laser marking system comprises a laser, an image capture device, a marking head including electromagnetic energy deflectors and at least one lens, a beam path of the laser and a beam path of the image capture device both passing through the at least one lens, and a computer system operable to perform a method comprising capturing image tiles at each of multiple different locations with the image capture device, stitching the image tiles to produce a composite image of the marking field, identifying a location and orientation of an image of a workpiece within the composite image of the marking field, determining a location and orientation of a mark to be applied to the workpiece based (Continued)

on the location and orientation of the image of the workpiece within the composite image of the marking field, and applying the mark to the workpiece with the laser.

33 Claims, 23 Drawing Sheets

(51) Int. Cl.
  *B23K 26/082* (2014.01)
  *G06T 7/73* (2017.01)

(58) Field of Classification Search
  CPC ......... G06T 11/60; G06T 7/80; G06T 3/4038; G06T 7/33; G06T 7/40; G06T 7/0004; G06T 19/006; G06T 7/571; B23K 26/032; B23K 26/03; B23K 26/364; B23K 26/702; B23K 26/127; B23K 26/20; B23K 26/36; B23K 26/352; B23K 26/18; B23K 26/361; B23K 26/0736; B23K 26/402; B23K 37/0235; B23K 26/40; B23K 26/38; B23K 26/362; B23K 37/0461; B23K 37/0408; B23K 10/006; B23K 37/0211; B23K 31/12; B23K 26/21; B23K 26/355; B23K 26/00; B23K 26/073; B23K 26/0006; B23K 26/359; B23K 26/10; B23K 26/705; B23K 26/02; B23K 26/70; B23K 26/0821; B23K 26/50; B23K 26/14; B23K 26/1464; B23K 26/351; B23K 15/08; G06Q 10/043; H04N 7/181; H04N 1/12; H04N 9/3179; H04N 1/192; H04N 9/3194; H04N 13/111; H04N 13/275; H04N 13/211; H04N 5/247; A43B 9/00; B29D 35/00; D05C 5/02; G01B 21/042; G01B 11/03; G01B 11/14; G01B 11/24; G01B 11/2518; G01B 11/002; G01B 5/004; G01B 21/045; G01B 11/0608; G01B 11/2513; G05B 19/40937; G05B 19/4069; G05B 19/19; G05B 19/18; G05B 19/4093; G05B 19/4097; G05B 19/406; G05B 19/402; G05B 19/401; G05B 19/4086; G02B 26/101; G02B 26/105; G02B 7/365; G06F 3/0425; B25F 5/021; B26D 5/00; B26D 5/005; B26D 5/007; B23Q 17/2233; B23Q 17/22; B23B 25/06; B41J 2/442; B41J 2/47; B41J 2/471; G06V 10/40; B01J 19/121; G01C 3/08; G01C 15/002; G01C 15/004; G01S 17/48; G01S 17/89; G01S 17/86; G01S 7/4813; G01S 17/66; G01S 7/4815; G01S 7/4972; G01S 7/4811; G01S 17/42; G01S 7/4808; G01S 5/163; G01S 17/87; B29C 59/16; G06K 1/126; G06K 9/46; H01L 21/67282; H01L 21/681; H01L 23/544; B44B 3/009; B44B 7/007; B44C 1/228; G01N 21/87; H05K 1/0266
  See application file for complete search history.

(56) References Cited

U.S. PATENT DOCUMENTS

| | | | |
|---|---|---|---|
| 2010/0292947 A1* | 11/2010 | Buk | B23K 26/082 702/94 |
| 2016/0114434 A1* | 4/2016 | Regaard | B23K 26/046 219/121.81 |
| 2017/0178379 A1* | 6/2017 | Fu | G06Q 10/043 |
| 2017/0227644 A1* | 8/2017 | Boillot | G01S 17/48 |

FOREIGN PATENT DOCUMENTS

| | | |
|---|---|---|
| EP | 1096777 A1 | 5/2001 |
| JP | 2002316276 A | 10/2002 |

OTHER PUBLICATIONS

International Search Report and Written Opinion from International Application No. PCT/US2018/059248 dated Mar. 6, 2019.
International Preliminary Report on Patentability from the International Preliminary Examining Authority for International Application No. PCT/US2018/059248 dated Oct. 8, 2019.
European Communication of a Notice of Opposition for EP Application No. 18821772.3, dated Oct. 7, 2022 (31 Pages).
Braunreuther et al., Welding Joint Detection by Calibrated Mosaicking with Laser Scanner Systems, CIRP Journal of Manufacturing Science and Technology, Mar. 2015, vol. 10, pp. 16-23.
Brief Communication together with Submission in Opposition Proceedings and Response to the Proprietor's Submission for European Application No. 18821772.3, dated Aug. 2, 2023, 13 pages.
Submission in Opposition Proceedings for European Application No. 18821772.3, dated Feb. 28, 2023, 2 pages.
Observation for Opposition against EP Application No. 18821772.3, dated Feb. 28, 2023, 29 pages.
Claims (Auxiliary Request 1, marked up), dated Feb. 28, 2023, 3 pages.
Claims (Auxiliary Request 1) dated Feb. 28, 2023, 3 pages.
Claims (Auxiliary Request 2, marked up), dated Feb. 28, 2023, 3 pages.
Claims (Auxiliary Request 2), dated Feb. 28, 2023, 3 pages.
Claims (Auxiliary Request 3, marked up) dated Feb. 28, 2023, 3 pages.
Claims (Auxiliary Request 3), dated Feb. 28, 2023, 3 pages.
Claims (Auxiliary Request 4, marked up), dated Feb. 28, 2023, 3 pages.
Claims (Auxiliary Request 4), dated Feb. 28, 2023, 3 pages.
Claims (Auxiliary Request 5, marked up), dated Feb. 28, 2023, 3 pages.
Claims (Auxiliary Request 5), dated Feb. 28, 2023, 3 pages.
Claims (Auxiliary Request 6, marked up), dated Feb. 28, 2023, 3 pages.
Claims (Auxiliary Request 6), dated Feb. 28, 2023, 3 pages.
Claims (Auxiliary Request 7, marked up), dated Feb. 28, 2023, 3 pages.
Claims (Auxiliary Request 7), dated Feb. 28, 2023, 3 pages.
Claims (Auxiliary Request 8, marked up), dated Feb. 28, 2023, 3 pages.
Claims (Auxiliary Request 8), dated Feb. 28, 2023, 3 pages.
Claims (Auxiliary Request 9, marked up), dated Feb. 28, 2023, 3 pages.
Claims (Auxiliary Request 9), dated Feb. 28, 2023, 3 pages.
Acknowledgement of Receipt for Submission by Proprietor, dated Feb. 28, 2023, 2 pages.

* cited by examiner

LASER MARKING THROUGH THE LENS OF AN IMAGE SCANNING SYSTEM

CROSS-REFERENCE TO RELATED APPLICATIONS

This application is a national stage application under 35 U.S.C. § 371 of PCT application Serial No. PCT/US18/59248, titled LASER MARKING THROUGH THE LENS OF AN IMAGE SCANNING SYSTEM, filed Nov. 5, 2018, that claims priority under 35 U.S.C. § 119(e) to U.S. Provisional Patent Application No. 62/581,928, titled LASER MARKING THROUGH THE LENS OF AN IMAGE SCANNING SYSTEM, filed Nov. 6, 2017. Each of these applications is incorporated by reference herein in its entirety for all purposes.

BACKGROUND

Laser marking systems may be utilized to imprint markings, for example, images, identification numbers, expiration dates, bar codes, etc. on the surfaces of various products. Manufacturers often prefer that laser marking of products is repeatable such that each of a particular product passing through a laser marking system is marked in the same location on the product. Machine vision systems utilizing a camera may assist a laser marking system in identifying and determining a position and orientation of a product in the laser marking system so that a marking laser may be directed to a desired area on the product.

SUMMARY

In accordance with one aspect, there is provided a laser marking system. The laser marking system comprises a laser, an image capture device, a marking head including electromagnetic energy deflectors and at least one lens, a beam path of the laser and a beam path of the image capture device both passing through the at least one lens, and a computer system operable to perform a method comprising adjusting the electromagnetic energy deflectors to direct the beam path of the image capture device to multiple different locations within a marking field of the laser marking system, capturing image tiles at each of the multiple different locations with the image capture device, stitching the image tiles to produce a composite image of the marking field, identifying a location and orientation of an image of a workpiece within the composite image of the marking field, determining a location and orientation of a mark to be applied to the workpiece based on the location and orientation of the image of the workpiece within the composite image of the marking field, and applying the mark to the workpiece with the laser.

In some embodiments, the computer system is operable to identify the location and orientation of the image of the workpiece within the composite image of the marking field by applying an image model of the workpiece to the composite image. The computer system may be further operable to create the image model from a composite image of the marking field including an image of a master workpiece. The computer system may be further operable to identify a location of one or more additional features of the image of the workpiece utilizing one or more additional feature models. The one or more additional feature models may include Multi Model Registration feature models.

In some embodiments, the computer system is further operable to identify locations and orientations of images of multiple different types of workpieces within the composite image of the marking field and to mark the multiple different types of workpieces with the laser in a single run.

In some embodiments, the computer system is operable to identify the location and orientation of the image of the workpiece within the composite image of the marking field without the workpiece being held in a fixture.

In some embodiments, the computer system is operable to identify the location and orientation of the image of a workpiece having dimensions greater than a field of view of the image capture device within the composite image of the marking field.

In some embodiments, the laser marking system further comprises a dichroic mirror disposed in both the beam path of the laser and the beam path of the image capture device. The laser may be configured to produce a laser beam at a frequency at which the dichroic mirror is substantially transparent.

In accordance with another aspect, there is provided a method of laser marking a workpiece with a laser marking system. The method comprises directing a beam path of an image capture device of the laser marking system to multiple different locations within a marking field of the laser marking system, capturing image tiles at each of the multiple different locations with the image capture device, stitching the image tiles to produce a composite image of the marking field, identifying a location and orientation of an image of the workpiece within the composite image of the marking field, determining a location and orientation of a mark to be applied to the workpiece based on the location and orientation of the image of the workpiece within the composite image of the marking field, and applying the mark to the workpiece with a laser of the laser marking system.

In some embodiments, the method further comprises directing the beam path of the image capture device and a laser beam produced by the laser through a common lens in a marking head of the laser marking system

BRIIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

DETAILED DESCRIPTION

Figure 1A:
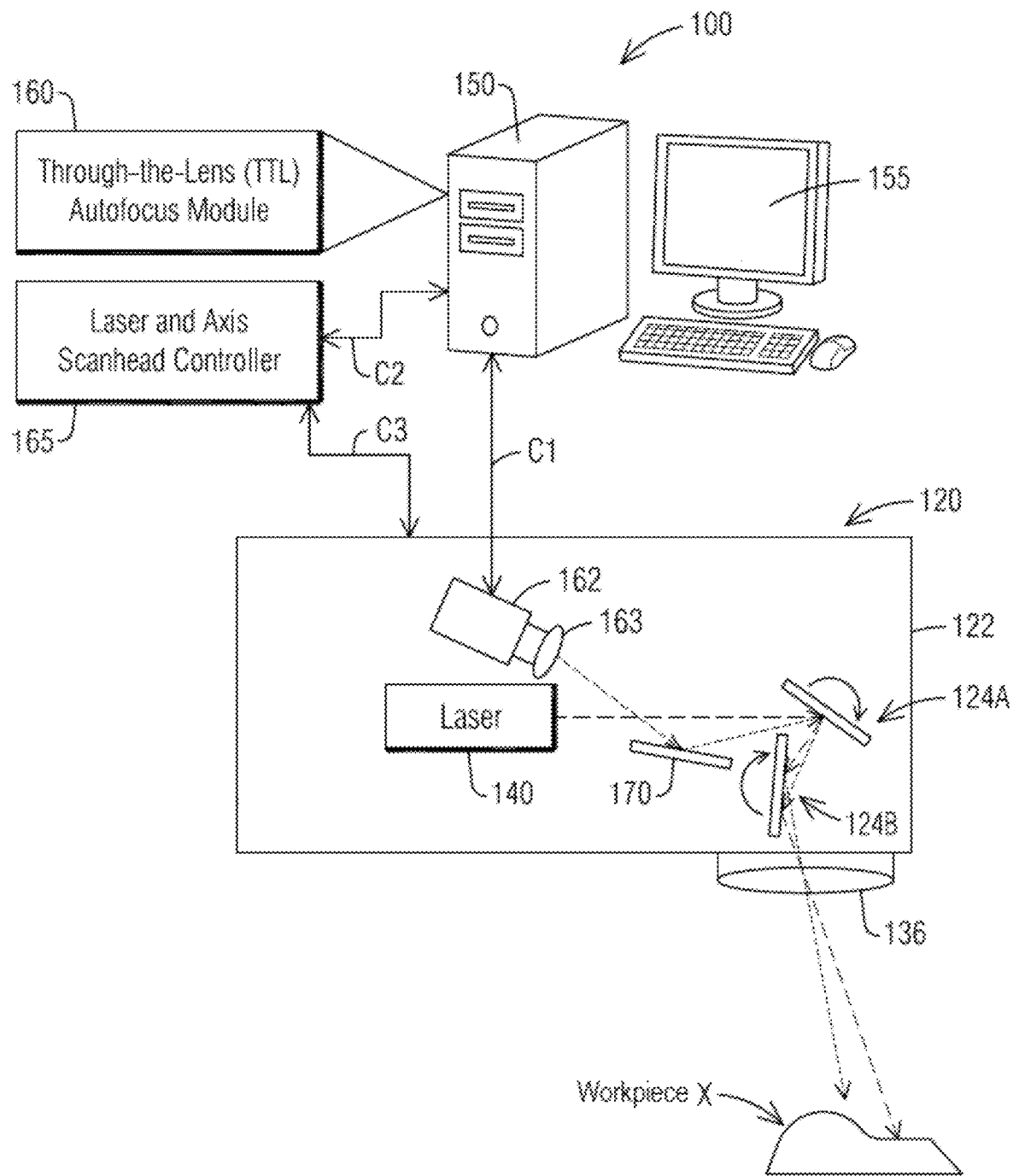
FIG. 1A illustrates a block diagram of a laser marking system.

In some examples of laser marking systems, a camera may be integrated with the laser optics to image a workpiece to be marked through the same lens as a laser used to mark the workpiece passes. Such camera arrangements are referred to as "through-the-lens" cameras. The field of view (FOV) of a through-the-lens camera may cover only a small portion (~3%) of the overall laser marking field of a laser marking system. As a result, it can be difficult to train a laser marking system utilizing through-the-lens camera vision system to recognize workpieces that are larger than the camera FOV. The through-the-lens camera vision system may impose restrictions on the placement of such workpieces in the laser marking system during production. When the entire outline of the workpiece cannot be seen, there may not be sufficient edges within the FOV for repeatable alignment, even with multiple vision models. Multiple vision models may be used to validate a specific workpiece, however, in addition to being difficult to train, workpieces that are aligned with multiple models must be placed carefully within the laser marking system during production. This can lead to the need for workpiece-specific fixtures, an increased risk of failure due to misplaced workpieces, extra operator training, etc. External imaging solutions, in which the camera does not look through the lens of the laser, may be able to register larger workpieces, but tend to be slow or inaccurate because the workpiece must be imaged at an angle, or physically moved between imaging and laser marking. In systems utilizing a camera that is offset from the laser lens, improper positioning of the workpiece may hide or distort an image of a feature of a workpiece that the system uses to identify the workpiece or to determine a position or orientation of the workpiece.

Aspects and embodiments disclosed herein include a laser marking system having functionality for identifying a product or workpiece to be marked and an orientation of the workpiece to be marked within the working area of the laser marking system so that the location of an area on the workpiece to be marked by the laser marking system can be determined. The laser marking system may consistently mark workpieces in desired locations regardless of how the workpieces are oriented when placed within the working area of the laser marking system. A machine vision system may capture an image of an entire workpiece to be marked and compare the image to models in a database to identify the workpiece. An outline of the workpiece and/or the position of one or more target features of the workpiece may be utilized to determine an orientation of the workpiece. The location on the workpiece where the workpiece is to be marked and an orientation of the mark to be applied to the workpiece may be determined from the position and orientation of the workpiece and/or the position and relative location of one or more target features. An image of the entire marking field of a laser marking system may be generated by combining multiple images from different locations, allowing workpieces much larger than the camera FOV to be seen in any orientation.

Aspects and embodiments disclosed herein provide for workpieces that are larger than the camera FOV to be trained easily for run-time vision processing (including mark alignment), reducing the job setup time for such workpieces. Furthermore, an operator may place the workpiece into the system in any orientation for processing, provided that the previously trained workpiece surface is visible.

Aspects and embodiments disclosed herein may utilize a through-the-lens camera arrangement that images a workpiece to be marked directly from above, along a same or substantially similar optical path as a laser used to mark the workpiece. By imaging the workpiece directly from above, aspects and embodiments disclosed herein avoid possible problems with the use of an external camera that images the workpiece at an angle, which can lead to shading and obstructions that change significantly in the image when the part is rotated.

Aspects and embodiments disclosed herein work by using through-the-lens vision capability to capture multiple images from different locations in the marking field of a laser marking system. The calibration of the vision system allows each image to be captured from a precise location by directing scanhead mirrors of the system as desired, before each capture. The images are then arranged in a grid and combined into a single image that covers the entire marking field. This image can then be used for standard vision activities (model training, job processing, etc.)

Herein, the term "mark" and its variants are used to refer not only to marking, but to other alterations of a workpiece performed by a laser, for example, etching, engraving, machining, cutting, welding, etc. In certain implementations, for example, marking entails producing a graphic on a workpiece using a process of capturing an image of the workpiece, comparing the position and orientation of the workpiece to a pre-existing computer-based model of the workpiece and the desired graphic, relatively oriented to their properly aligned positions, and marking the graphic on the workpiece using a laser to match the graphic positioned on the pre-existing computer-based model of the workpiece.

One example of a specially designed laser marking system including a through-the-lens camera arrangement which may be utilized in various embodiments disclosed herein is illustrated in FIG. 1A. The laser marking system 100 may comprise a marking scanhead 120, laser 140, and through-the-lens (TTL) vision system comprising a through-the-lens autofocus module 160 and camera device 162. The scanhead 120 may include galvo mirrors 124A and 124B and lens 136 (i.e., first lens). By way of non-limiting example, the lens 136 may be an F-theta focusing lens. The galvo mirrors 124A and 124B include X and Y axis mirrors and galvanometers. In operation, the galvo mirrors 124A and 124B are angularly adjustable to allow a laser beam from the laser 140 to mark a portion of a workpiece X anywhere within a marking field of the laser marking system (i.e., marking field 310 in FIG. 3).

Laser marking system 100 may employ a non-contact printing method providing mark quality and permanence. The laser marking system may include $CO_2$, Fiber, or ultraviolet (UV) laser sources in different power outputs to address a range of substrates and applications. The $CO_2$ laser sources may include laser sources having a power of 10 W, 30 W or 50 W. By way of non-limiting example, the laser 140 may be an infrared (IR) laser. The laser marking system 100 may be configured to apply a code having one or more of a serial number, time, date, and lot code. The laser marking system 100 may be configurable to apply a code in a particular code format including, without limitation, according to an industry standard code format.

The through-the-lens (TTL) vision system may comprise a camera device 162 which may be embedded in the marking scanhead 120 to capture images of the workpiece X through the F-theta lens 136 and TTL mirror 170. The camera device 162 may include a fixed focus lens 163 (i.e., second lens). Alternatively, the lens 163 may be variable to provide for the camera device 162 to adjust its focus. The TTL mirror 170 is in a path to receive reflections of the galvo mirrors 124A and 124B. In operation, by moving the galvo mirrors 124A and 124B, the camera view of camera device 162 may be directed at any area within the marking field (i.e., marking field 310 in FIG. 3) until any part of the workpiece X is in the field of view (FOV) of the camera device 162. The TTL mirror 170 may be a dichroic mirror. In other embodiments the TTL mirror 170 may be a regular (non-dichroic) mirror.

In an embodiment, the beam path of laser 140 may be directed to the galvo mirrors 124A and 124B. However, the beam path of the laser 140 bypasses the mirror 170 such that the beam path of the laser 140 is not reflected from the mirror 170 of the TTL vision system.

The system 100 may further comprise a processor or computing device 150 configured to perform an autofocus procedure and system calibration procedures to ensure that the focus point of the camera device 162 matches the focus point of the marking laser 140. The computing device 150 will be described in more detail in relation to FIG. 2. The controller 165 controls, via control line C3, the activation of the laser 140 to mark the workpiece X with a laser beam. The laser control may be part of the computer device 150.

The camera device 162 may be embedded in the laser 140 and may share galvo mirrors 124A and 124B with laser 140. The galvo mirrors 124A and 124B allow the camera device 162 to find focus on the majority of the marking field (i.e., marking field 310 in FIG. 3) through the lens 136. The beam path of the camera is represented as the short-dashed line.

The laser beam path is represented as the long-dashed line. The camera device 162 may communicate with computing device 150 via control lines C1 and the autofocus module to capture the image of the target surface of the workpiece. The captured image may be a camera view image. Any offset in a measured position of parts of the workpiece X caused by differences between the beam path of the camera and the laser beam path may be compensated for by software running on the computer device 150. The communications between the camera device 162 and the computing device may be conducted over control line C1 but may also be wireless.

The system 100 may further comprise a laser and axis scanhead (L&AS) controller 165.

The L&AS controller 165 may communicate with computing device 150 to receive the autofocus control signals C2. Based on the autofocus control signals C2, the L&AS controller causes the focal plane of the laser 140 and/or camera 162 to be adjusted utilizing one or more focusing methods known in the art. While lines are shown for control signals C1, C2, and C3, such signals in some embodiments may be wireless. The controller 165 may be a single controller or multiple controllers. For example, there may be one controller to operate the laser 140 and a separate and independent controller to operate the camera 162.

The TTL autofocus module 160 may include tools for identifying a Region of Interest (ROI) and an autofocus ROI editor. The ROI is a user-specified targeting of any surface on the workpiece X which is to be marked. The TTL autofocus module 160 may include a focus measurement level. The focus measurement level is at its highest where the focus is best, and lower everywhere else. The TTL autofocus module 160 may include finding a focus peak via a focus peak determination algorithm.

Figure 1B:
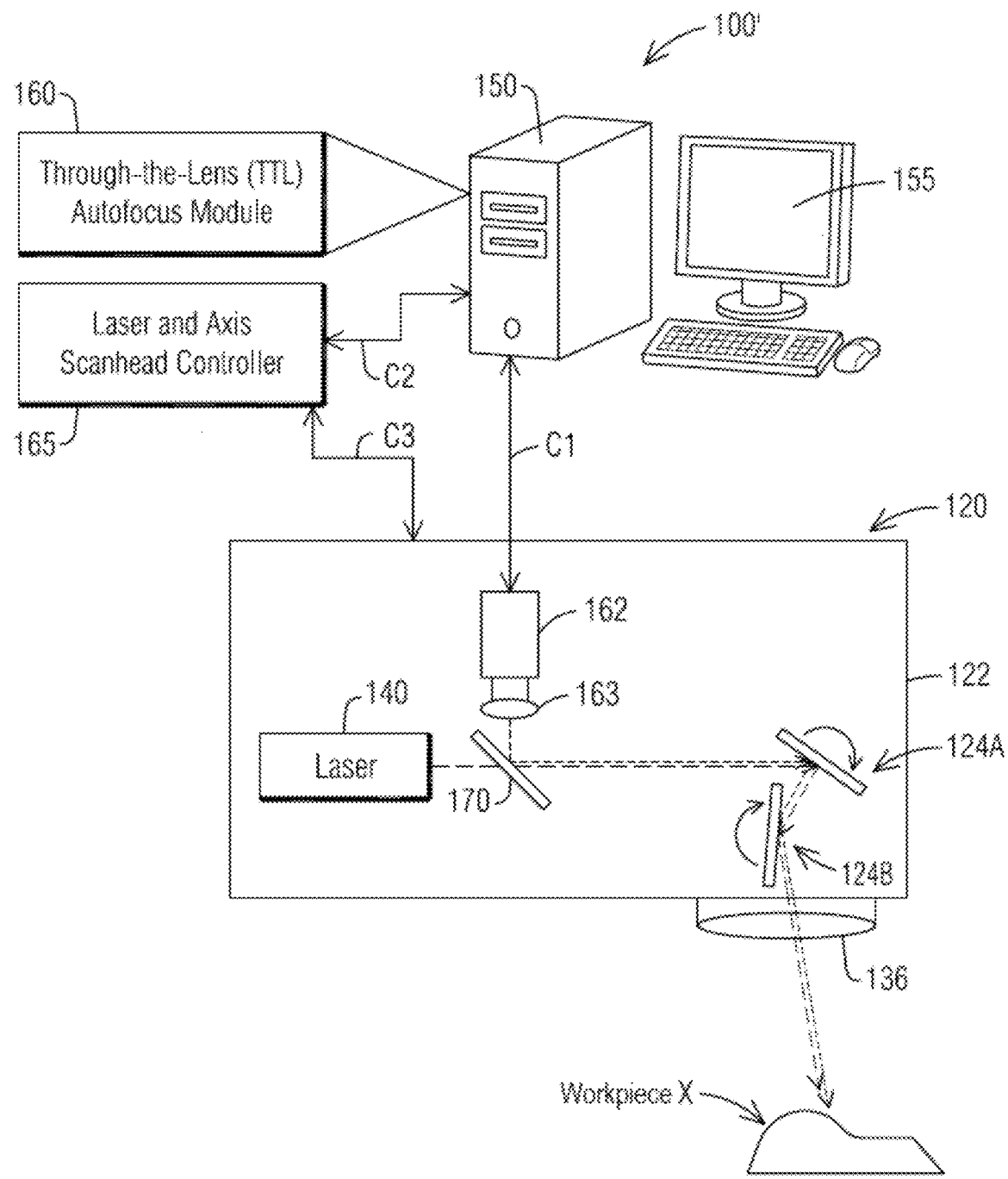
FIG. 1B illustrates a block diagram of another laser marking system.

FIG. 1B illustrates a block diagram of another laser marking system 100'. The system 100' is similar to system 100. A difference between system 100 and system 100' is that in system 100' mirror 170 is a dichroic mirror placed in both the beam path of the laser 140 and the camera 162 line of sight. The laser 140 emits laser radiation at a frequency, for example, in the infrared band, at which the mirror 170 is transparent. The mirror 170 may reflect light in the visible spectrum into the camera 162. In a non-limiting example, the mirror 170 may be a silicon mirror. In system 100' the beam path of the camera 162 and that of the laser 140 are parallel or overlapping such that the position of a part of the workpiece X measured by the camera 162 will accurately reflect the position of the part of the workpiece X the laser beam will be directed to.

Figure 1C:
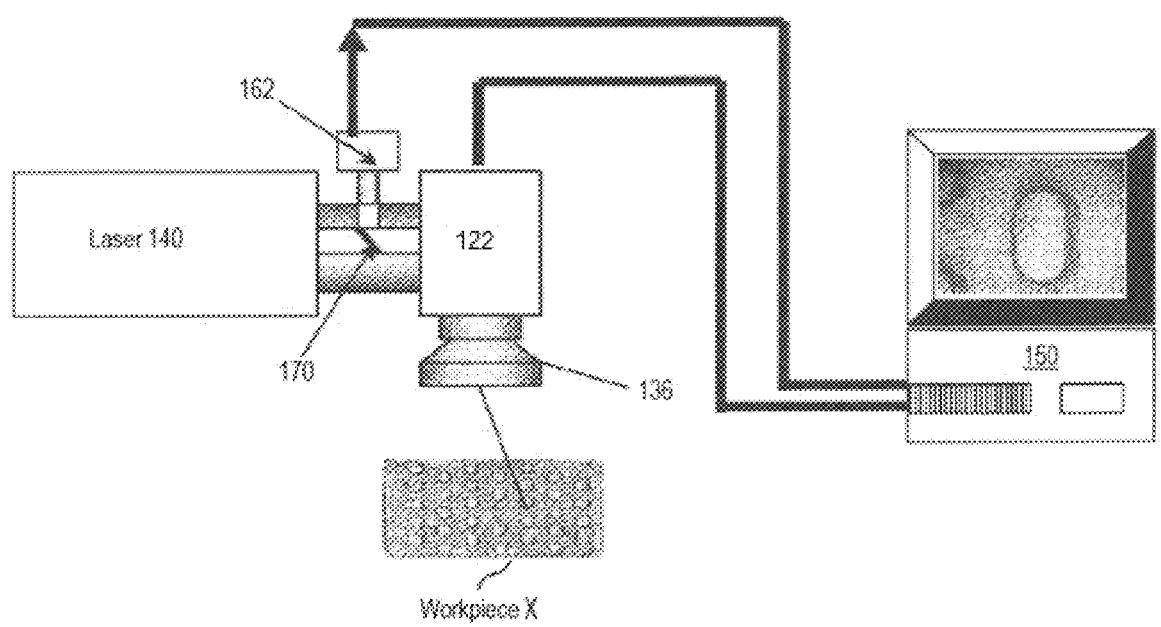
FIG. 1C illustrates a block diagram of another laser marking system.

FIGS. 1A and 1B illustrate laser marking systems in which a laser 140, camera 162, and mirror 170 are disposed within the housing 122 of the scanhead 120. In other embodiments, for example, as illustrated in FIG. 1C, the laser 140, camera 162, and mirror 170 are disposed outside of the housing 122 of the scanhead 120 while the galvo mirrors 124A and 124B (not illustrated in FIG. 1C) are disposed within the housing 122 of the scanhead 120.

Figure 2:
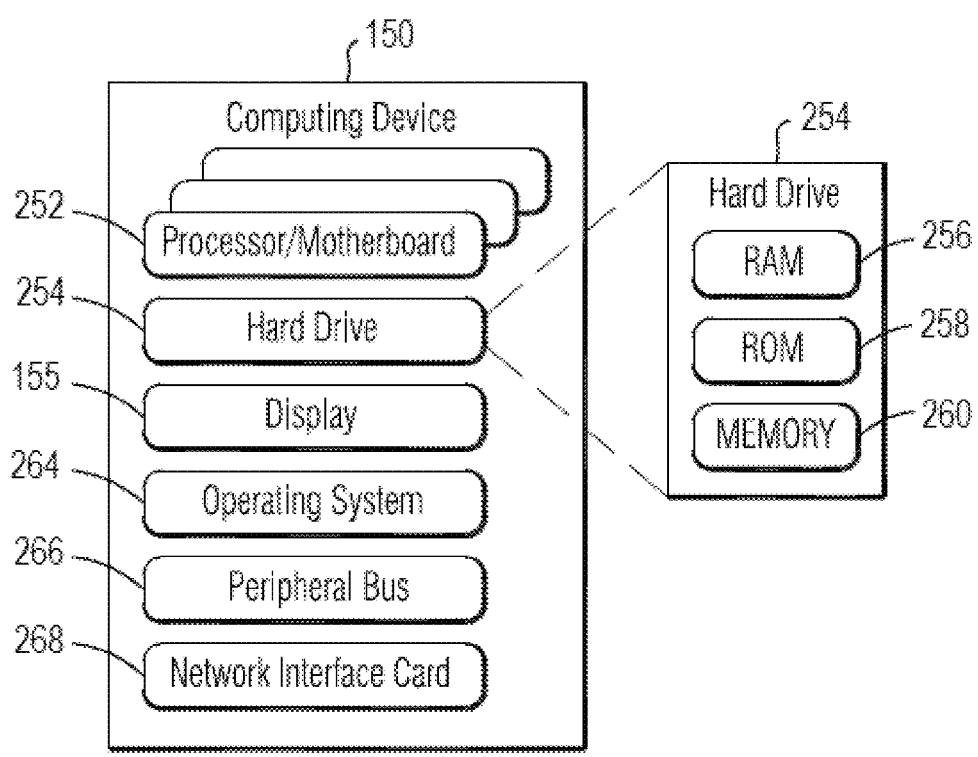
FIG. 2 illustrates a block diagram of a computing device.

Referring now to FIG. 2, in a basic configuration, the computing device 150 may include any type of stationary computing device or a mobile computing device. The computing device may be a computing system with one or more servers, each server including one or more processors. The term computing device and computing system may be interchangeable.

Computing device 150 may include one or more processors 252 and system memory in hard drive 254. Depending on the exact configuration and type of computing device, system memory may be volatile (such as RAM 256), non-volatile (such as read only memory (ROM 258), flash memory 260, and the like, or some combination thereof. System memory may store operating system 264, one or more applications, and may include program data for performing the processes described herein. Computing device 150 may also have additional features or functionality. For example, computing device 150 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

Computing device 150 may also include or have interfaces for input device(s) (not shown) such as a keyboard, mouse, pen, voice input device, touch input device, etc. The computing device 150 may include or have interfaces for connection to output device(s) such as a display 155, speakers, etc. The computing device 150 may include a peripheral bus 266 for connecting to peripherals. Computing device 150 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 150 may include a network interface card 268 to connect (wired or wireless) to a network.

Computer program code for carrying out operations described above may be written in a variety of programming languages, including but not limited to a high-level programming language, such as Java, C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible, non-transitory computer-readable storage medium such as a magnetic tape, a flexible disc, a hard disc, a compact disc, a photo-magnetic disc, a digital versatile disc (DVD).

The embodiments may be configured for use in a computer or a data processing apparatus which includes a memory, such as a central processing unit (CPU), a RAM and a ROM as well as a storage medium such as a hard disc.

Figure 3:
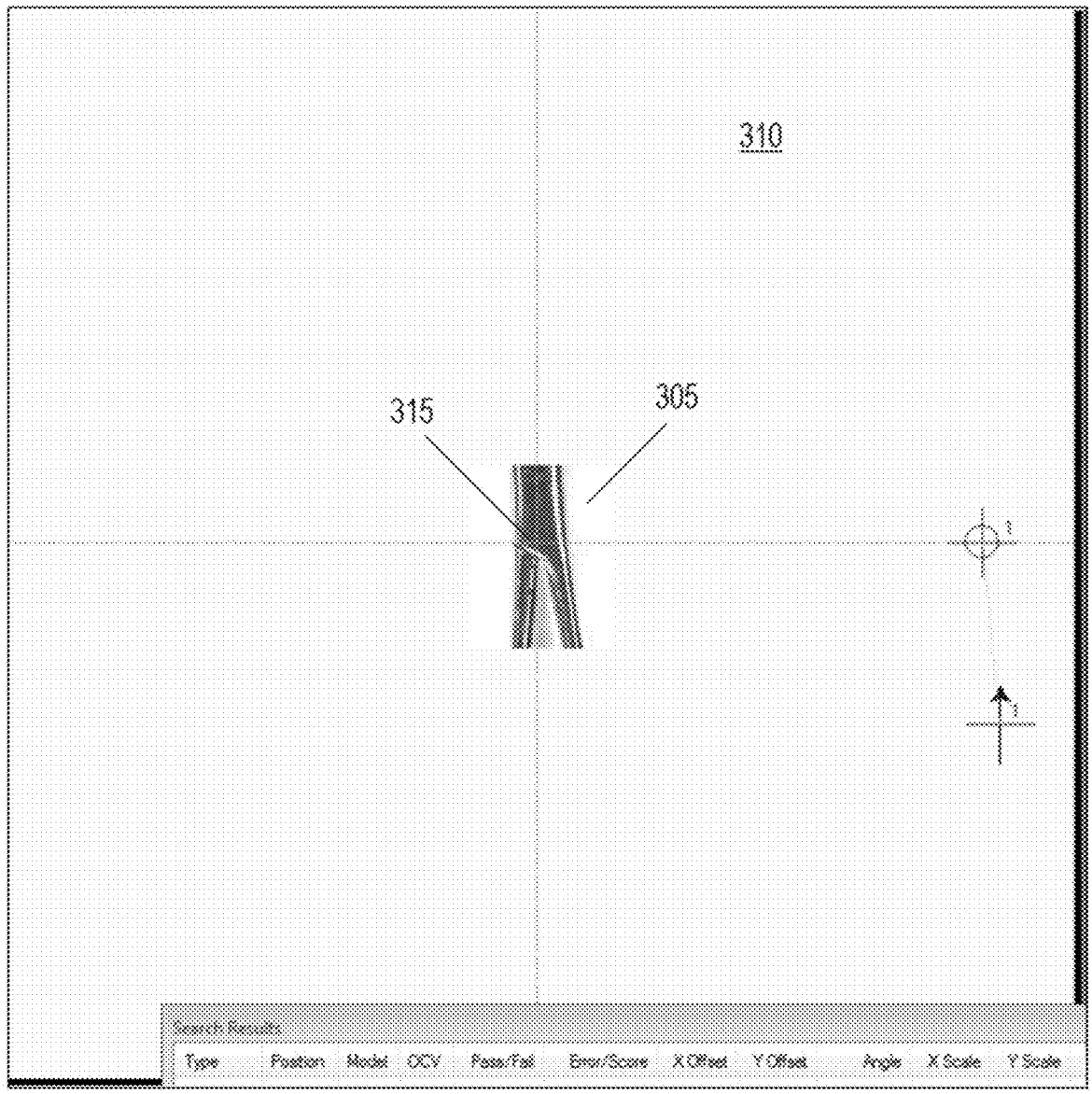
FIG. 3 illustrates the field of view of an imaging device of a laser marking system within a marking field of the laser marking system.

A marking field of a laser scanning system is the area over which the mirrors 124A and 124B in the scanhead 120 of the laser marking system may direct a laser beam from a laser 140 to mark a workpiece. The marking field of a laser marking system may be significantly larger than the FOV of a camera 162 of the laser scanning system, especially in embodiments in which the camera is arranged in a TTL vision system as described with reference to the systems of FIGS. 1A-1C. FIG. 3 illustrates the extent of a FOV 305 of a camera 162 in one example of a laser scanning system utilizing a TTL vision system relative to an area of the marking field 310 of the laser scanning system. As illustrated in FIG. 3, the FOV 305 of the camera 162 covers only a very small portion of the marking field 310. In one non-limiting example, the FOV 305 of the camera 162 may be about 2 cm across, while the marking field 310 may be up to 12 cm or 20 cm per side. For workpieces having dimensions greater than that of the FOV 305 of the camera 162 only a portion of the workpiece may fit within the FOV 305. For example, as illustrated in FIG. 3 only the central hinge portion of a clamp 315 to be marked is visible in the FOV 305 of the camera 162. Such a small portion of a workpiece may be insufficient for the laser marking system to align to and to determine an accurate location to apply a desired mark to the workpiece. For a workpiece small enough to fit within the FOV 305, if the workpiece is not placed in a known location within the marking field 310, for example, within a mounting bracket or fixture at a known location, it might take the laser marking system an undesirably long time to even locate the workpiece. Accordingly, in some previous implementations, the industry relies on dedicated fixtures or on an external camera to provide for a laser scanning system to identify and align to a workpiece. Dedicated fixtures add cost and external cameras have a perspective effect. To minimize the perspective effect, the part has to be in a specific orientation for the vision system to accurately identify and align to it; this is particularly true for parts that have a certain height. The taller the part, the more the orientation of the part is restricted and a fixture is required.

Figure 4A:
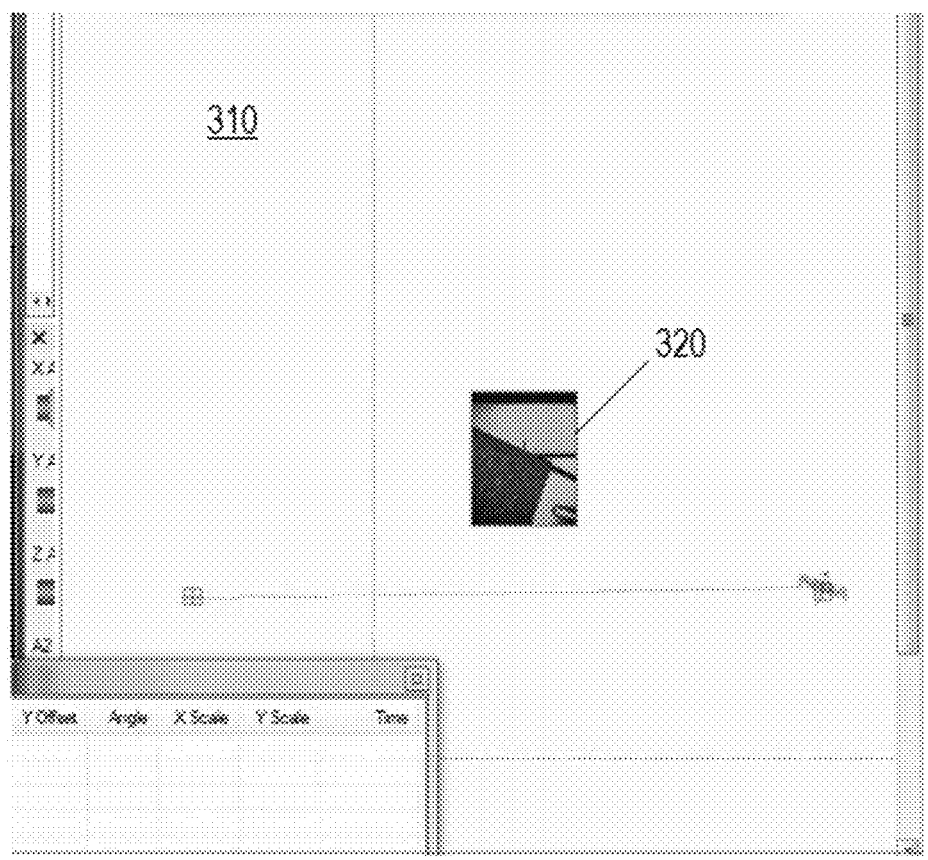
FIGS. 4A-4G illustrate the capture of image tiles within the marking field of the laser marking system and the creation of a composite image from a stitching of the image tiles.
Figure 4B:
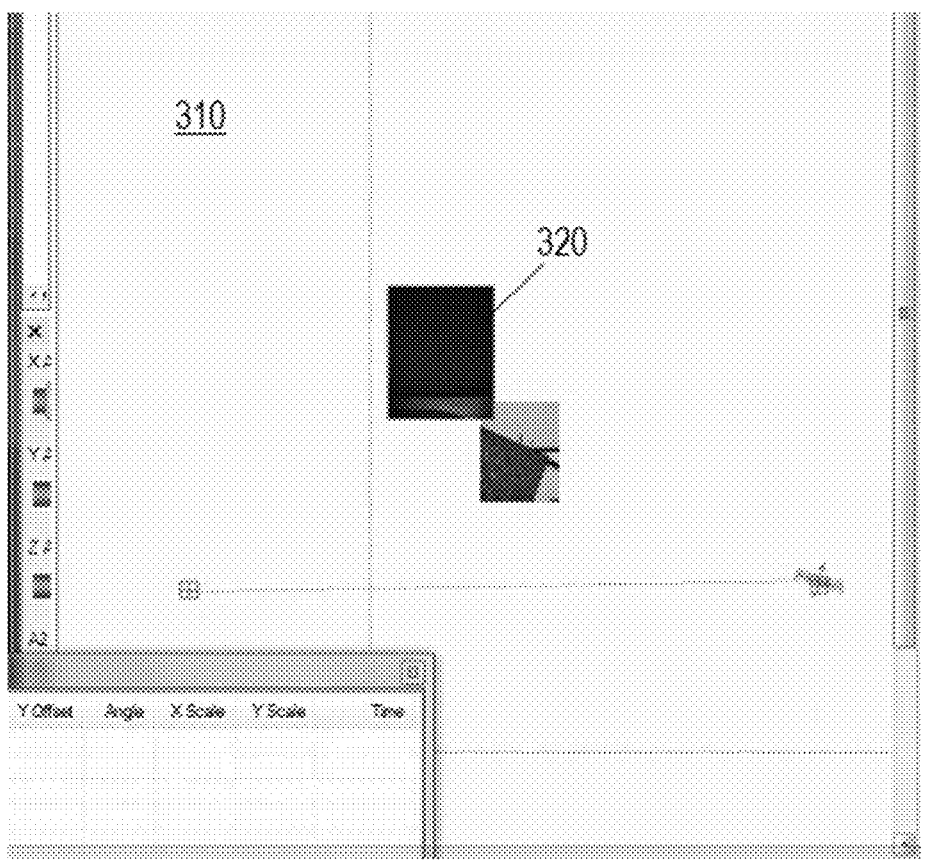
Figure 4C:
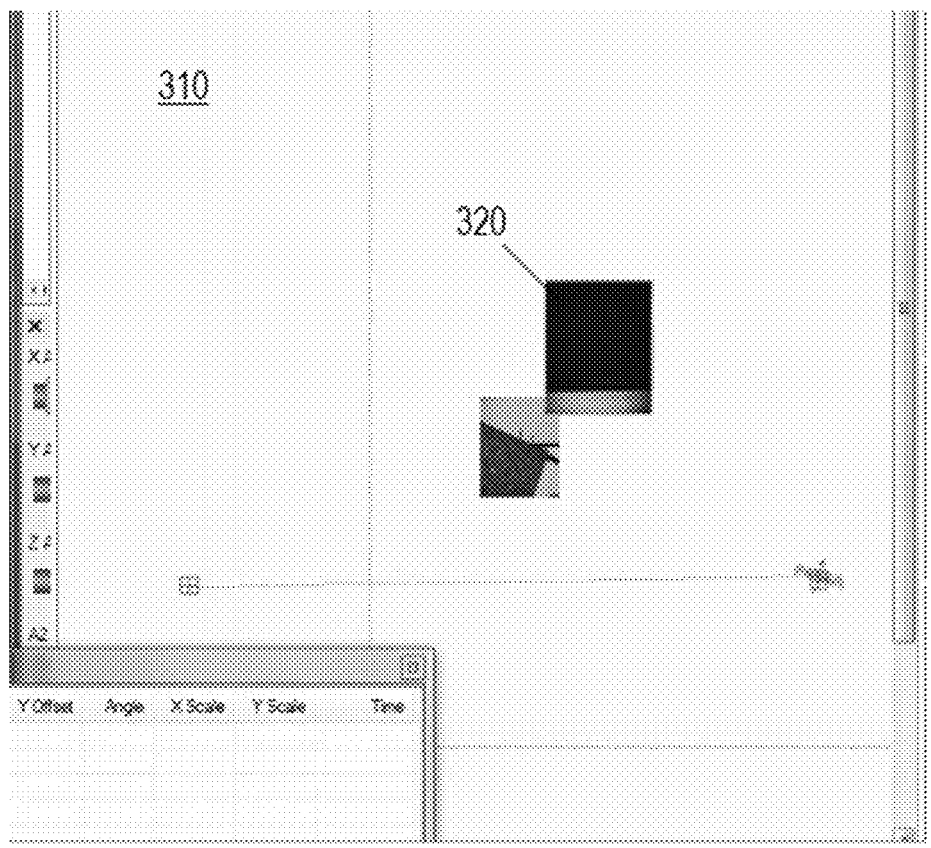
Figure 4D:
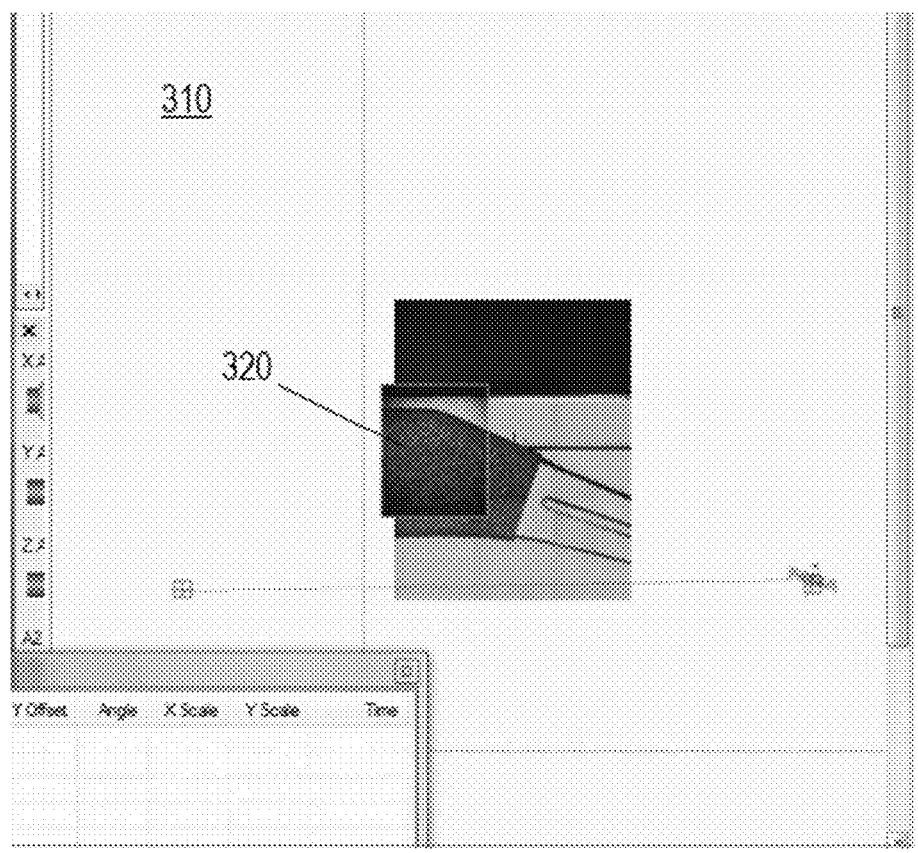
Figure 4E:
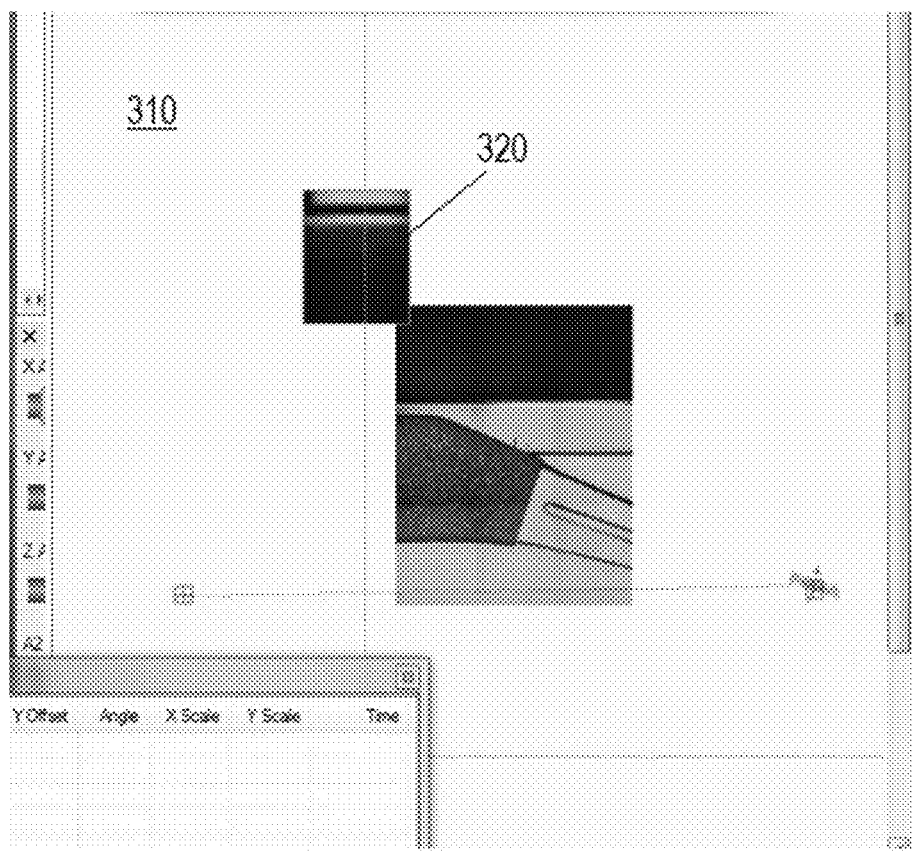
Figure 4F:
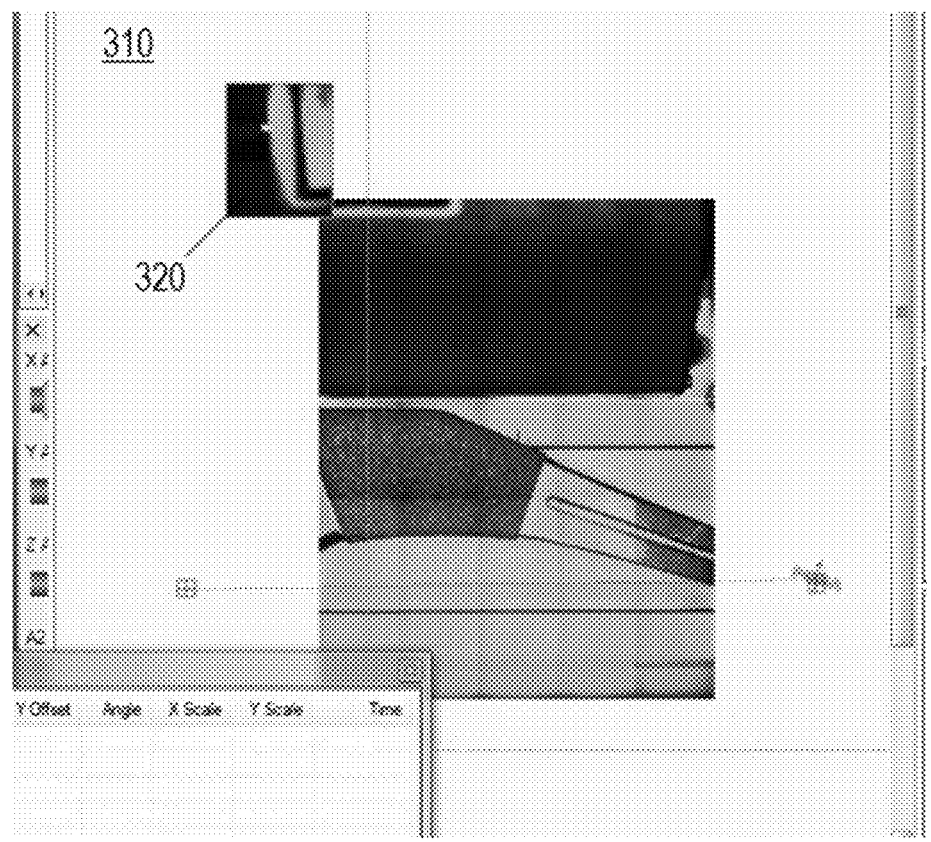
Figure 4G:
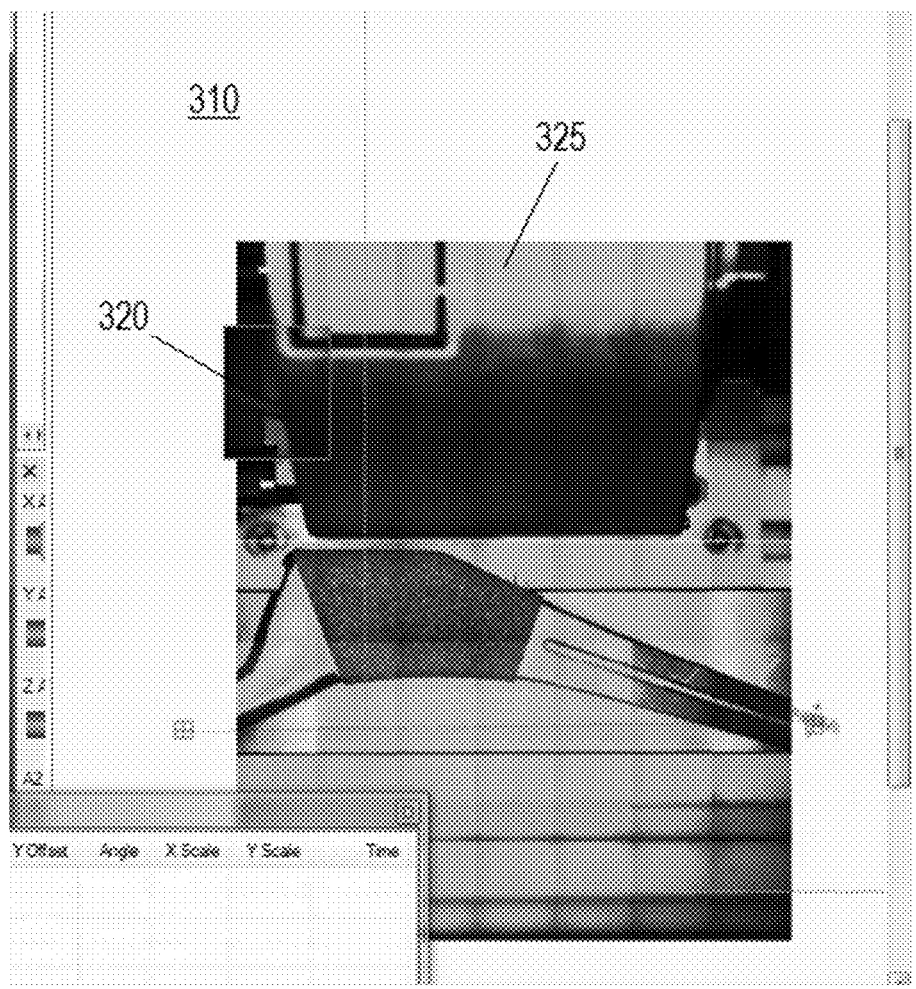

To overcome these difficulties, aspects and embodiments disclosed herein take multiple images (referred to herein as "tiles") throughout the marking field 310 and then stitch the tiles together to create a representation of a substantial portion or complete area of the marking field 310. As illustrated in FIGS. 4A-4G, the laser scanning system captures a first image or "tile" 320 within the marking field 310 that spans the FOV of the camera 162. The first tile 320 may be substantially centered within the marking field 310. Additional tiles 320 are captured about the first tile until a desired area of the marking field 310 is imaged. The plurality of tiles 320 are digitally stitched together to form a composite image 325 of a desired portion of the marking field 310 as illustrated in FIG. 4G. In the example of FIGS. 4A-4G, the tiles are captured in an order spiraling out from the location of the first tile, however, in other embodiments, the tiles may be captured row-by-row or column-by-column.

Figure 5A:
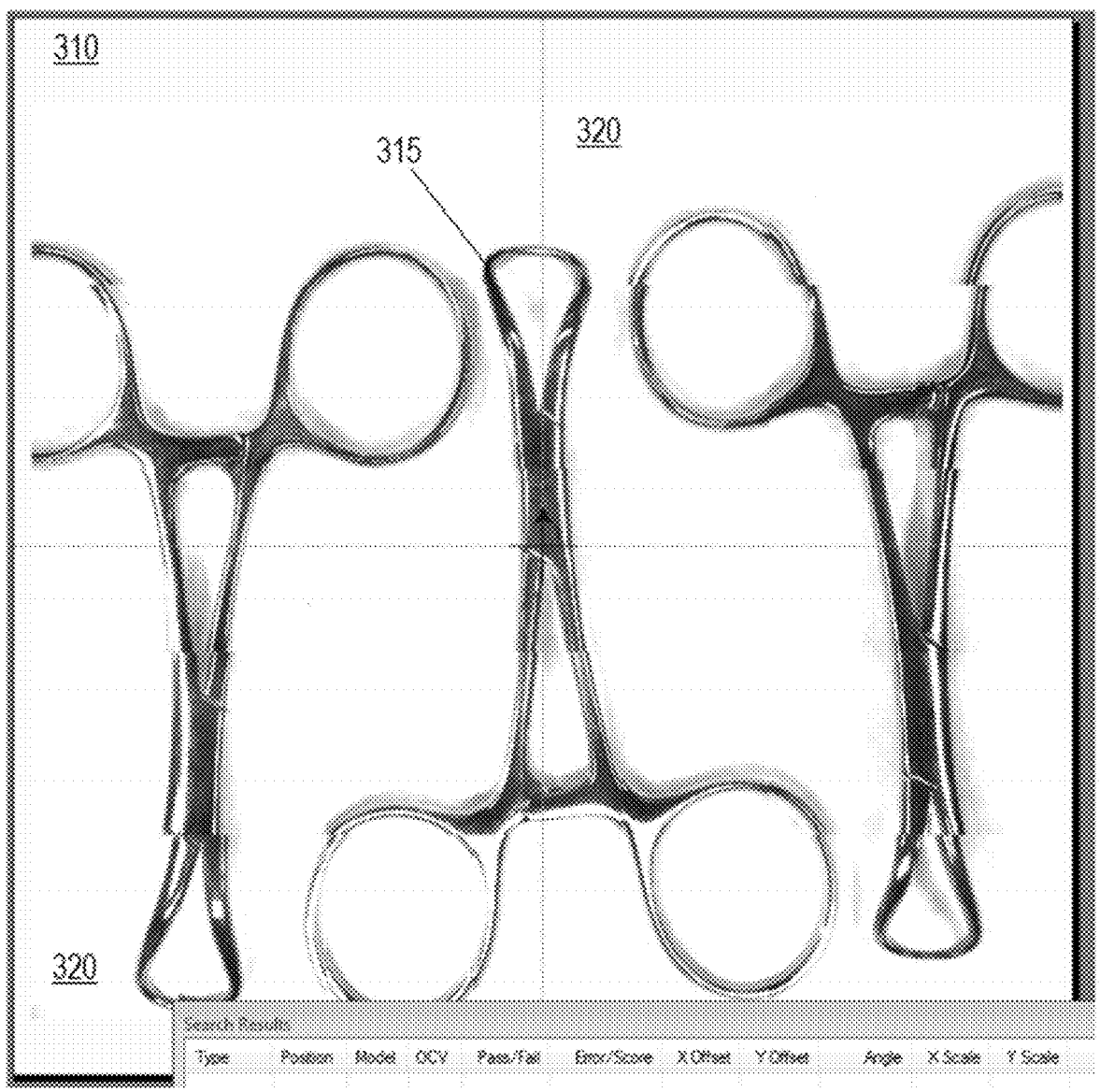
FIG. 5A illustrates an example a composite image of a marking field of a laser marking device including workpieces.
Figure 5B:
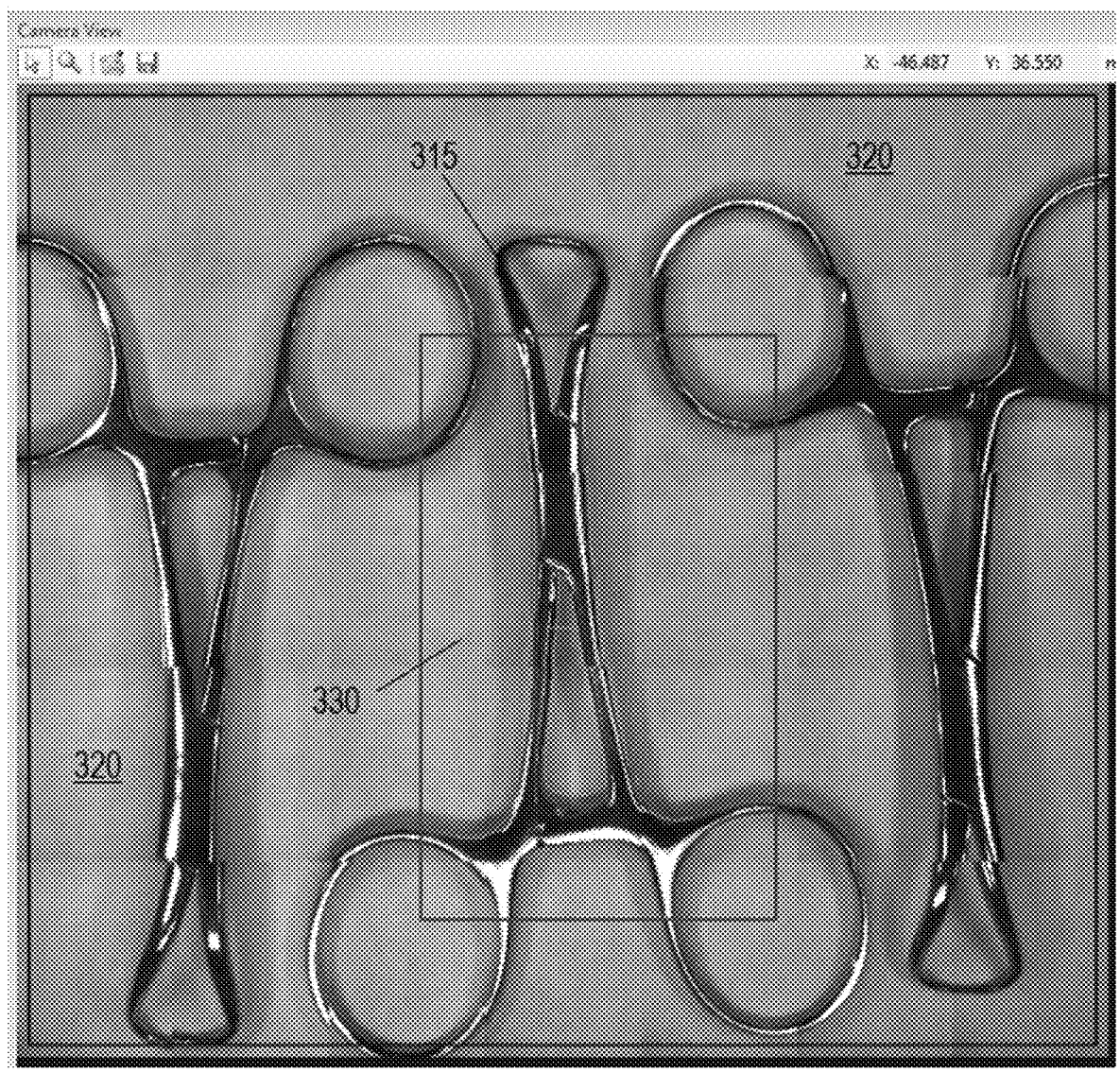
FIG. 5B illustrates an image model generated from one of the workpieces in the composite image of FIG. 5B.

Another example of a composite image of a marking field 310 including a plurality of stitched tiles 320 illustrating three clamps 315 is illustrated in FIG. 5A. In some embodiments, a vision model used to identify workpieces in a composite image of a marking field 310 is created using a computer model of a workpiece, for example using computer aided design (CAD) software. In other embodiments, a vision model used to identify workpieces in a composite image of a marking field 310 is created by analyzing a representative workpiece (a "master") in a first composite image of a marking field 310 including the representative workpiece, for example, the clamp 315 in FIG. 5B. Edge detection techniques or other image processing techniques may be used to create the vision model of the workpiece, for example, a model of an outline of at least a portion of the workpiece from analysis of the first composite image of the marking field 310 including the representative workpiece. A vision model of a clamp 315 in FIG. 5B is represented at 330.

Figure 6A:
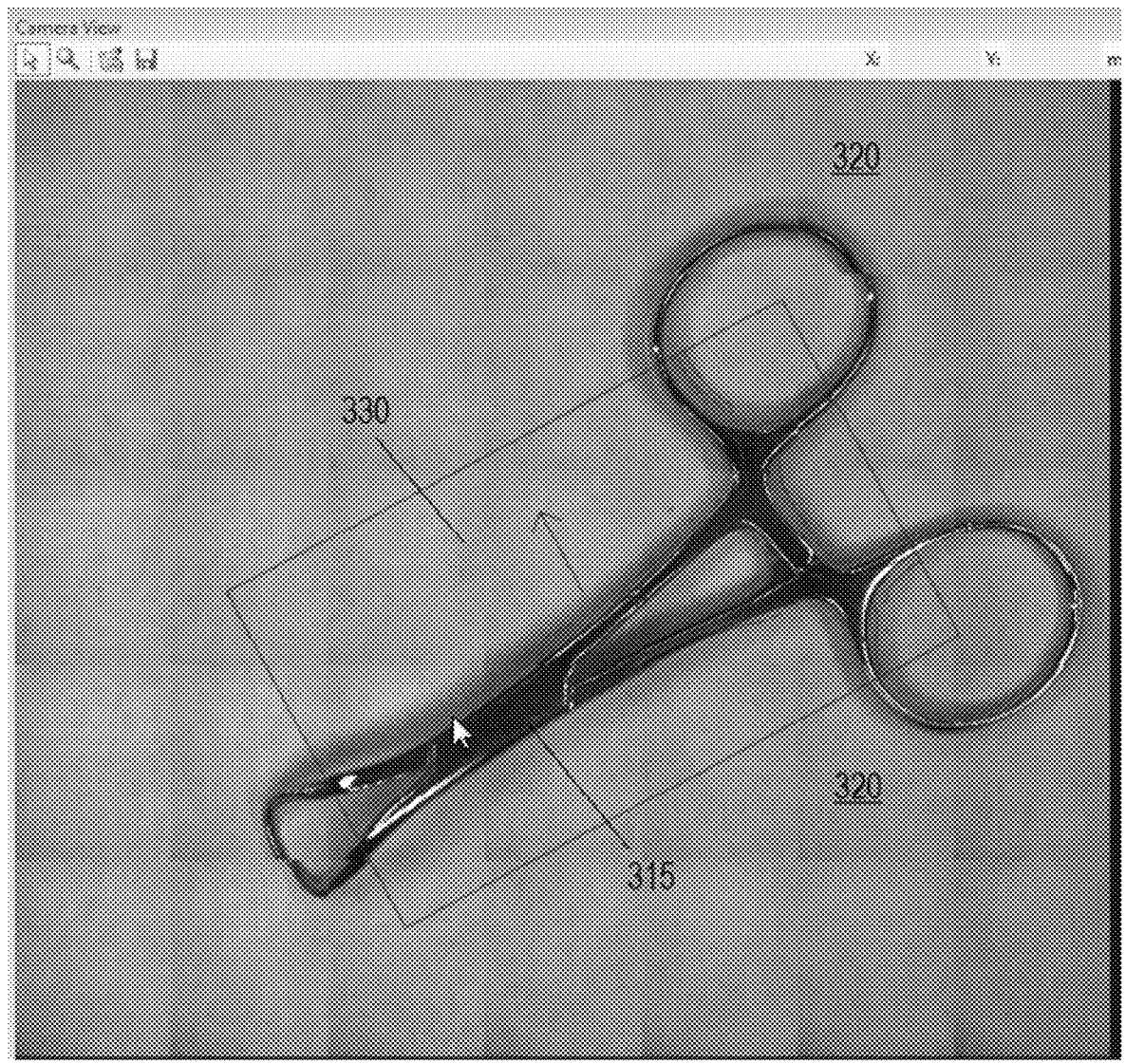
FIG. 6A illustrates the identification and determination of position and orientation of a workpiece in a composite image of a marking field of a laser marking device utilizing an image model of the workpiece.

After the vision model of a particular workpiece is created, a user may place a workpiece for laser marking on a stage within a marking field 310 of the laser marking system. The workpiece need not be oriented in a particular orientation or located at a particular location within the marking field. Responsive to receipt of instructions to locate a workpiece and laser mark the workpiece with a desired mark in a desired location, the laser marking system captures multiple image tiles of the marking field 310 and attempts to verify that a workpiece discovered in the marking field has features matching that of a previously created or predefined vision model. As illustrated in FIG. 6A, the laser marking system may identify the workpiece, e.g., clamp 315 with the previously created vision model 330. Based on how the vision model 330 is oriented and a location within the marking field 310 the vision model is located to match the features of the workpiece, the orientation and position of the physical workpiece is determined. The position of the physical workpiece may be determined with a degree of error of less than about 200 μm or less than about 150 μm. From the determination of the orientation and position of the physical workpiece a position and orientation of a desired mark to be laser marked on the workpiece is determined. The mark is applied to the desired location on the workpiece in the desired orientation. In some embodiments, a laser marking system may be instructed to seek multiple of the same type of workpiece within the marking field 310 and to identify and mark the multiple workpieces in a single operation. In some embodiments, a laser marking system may be instructed to seek multiple different types of workpieces within the marking field 310 utilizing different vision models and to identify and mark the multiple different types of workpieces in a single operation.

Figure 6B:
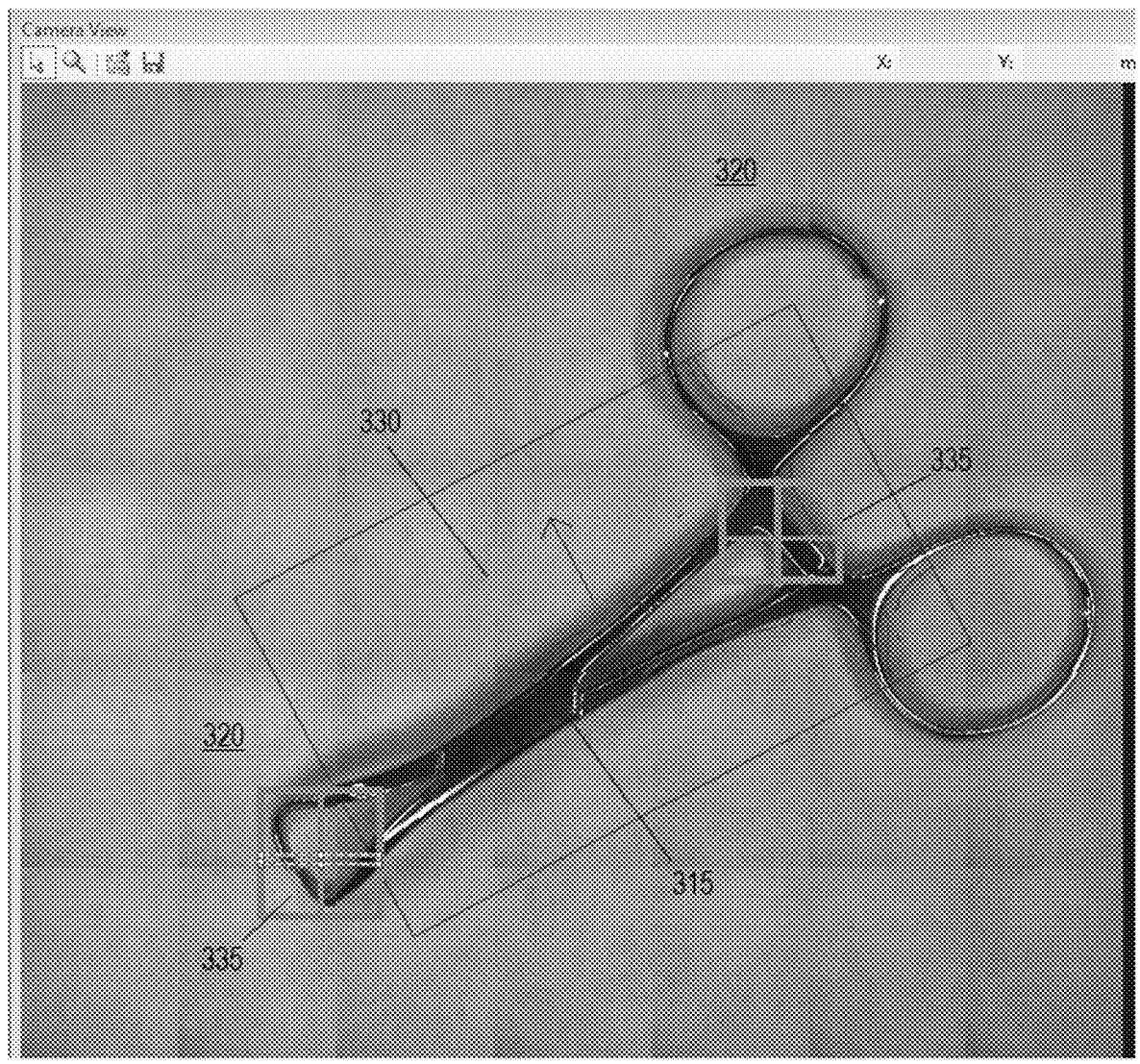
FIG. 6B illustrates the identification and determination of position and orientation of a workpiece in a composite image of a marking field of a laser marking device utilizing an image model of the workpiece and two additional feature modules of features of the workpiece.

For additional alignment accuracy, in addition to using the vision model 330 to identify the location and orientation of a workpiece, one or more additional feature models 335 may be applied to the stitched composite image of the marking field 310 including the workpiece to identify the position of the one or more additional features on the physical workpiece. Knowledge of the position of the one or more additional features on the physical workpiece may be used to refine the position and orientation determination performed by applying the vision model 330 to the stitched composite image of the marking field 310 including the workpiece. FIG. 6B illustrates two additional feature models 335 used to identify the location of two additional features of the clamp. The use of the one or more additional feature models 335 in conjunction with the vision model 330 to determine a location and orientation of the workpiece may increase the alignment and position determination accuracy to between about 25 μm and about 50 μm. The additional feature models may be generated and used to identify the location of the one or more additional features of the workpiece using a Multi Model Registration technique as described in co-owned U.S. Pat. No. 8,000,831 titled MULTI MODEL REGISTRATION (MMR) FOR A GALVONOMETER AND LASER SYSTEM, which is incorporated by reference herein in its entirety for all purposes.

Figure 7:
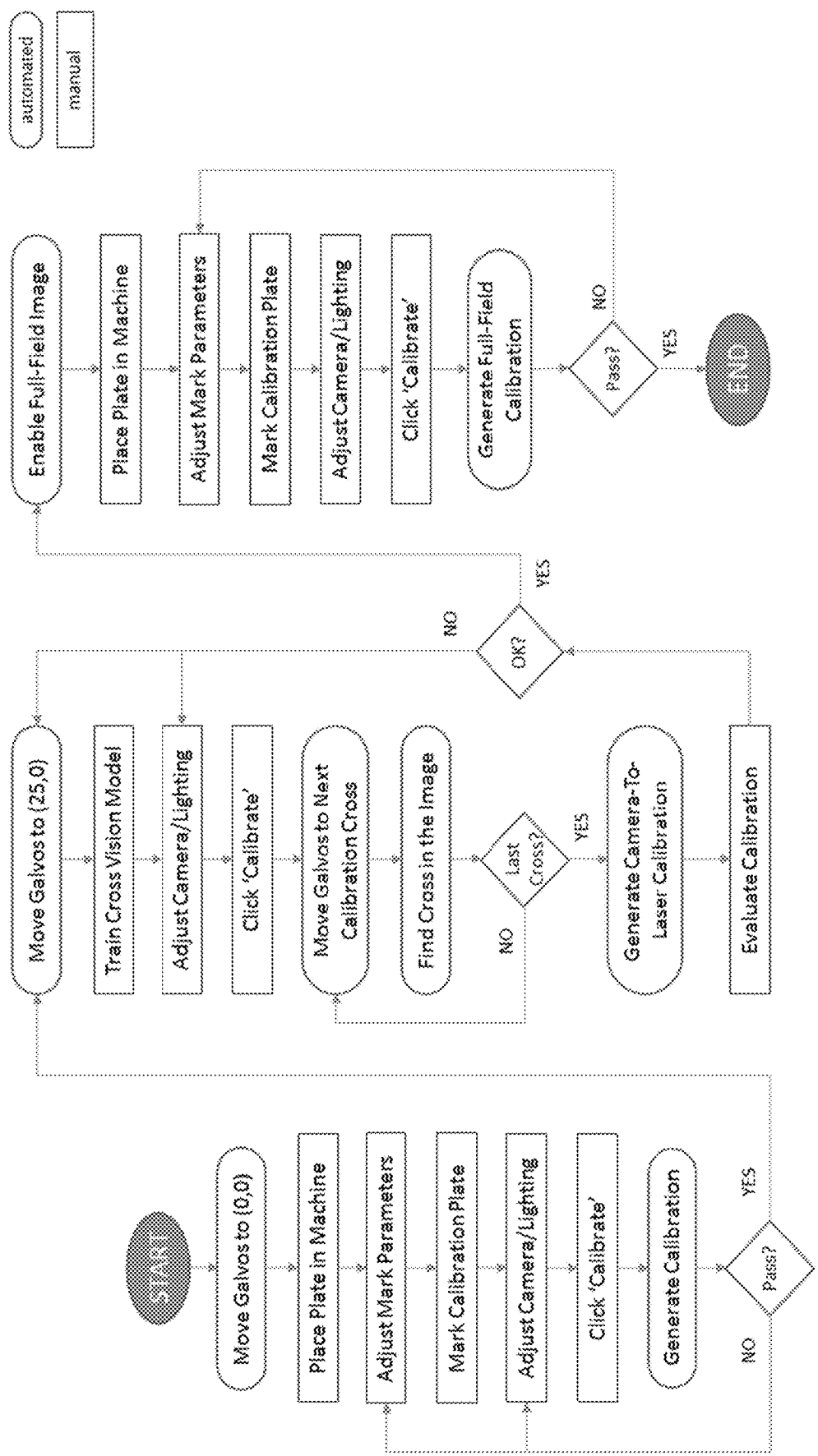
FIG. 7 is a flowchart of a method for calibrating a full field image in a laser marking system.

FIG. 7 is a flowchart of a method for calibrating a full field image in a laser marking system. In the flowchart of FIG. 7, acts that may be automated are illustrated in ovals and acts that may be performed manually are illustrated in rectangles.

Figure 8A:
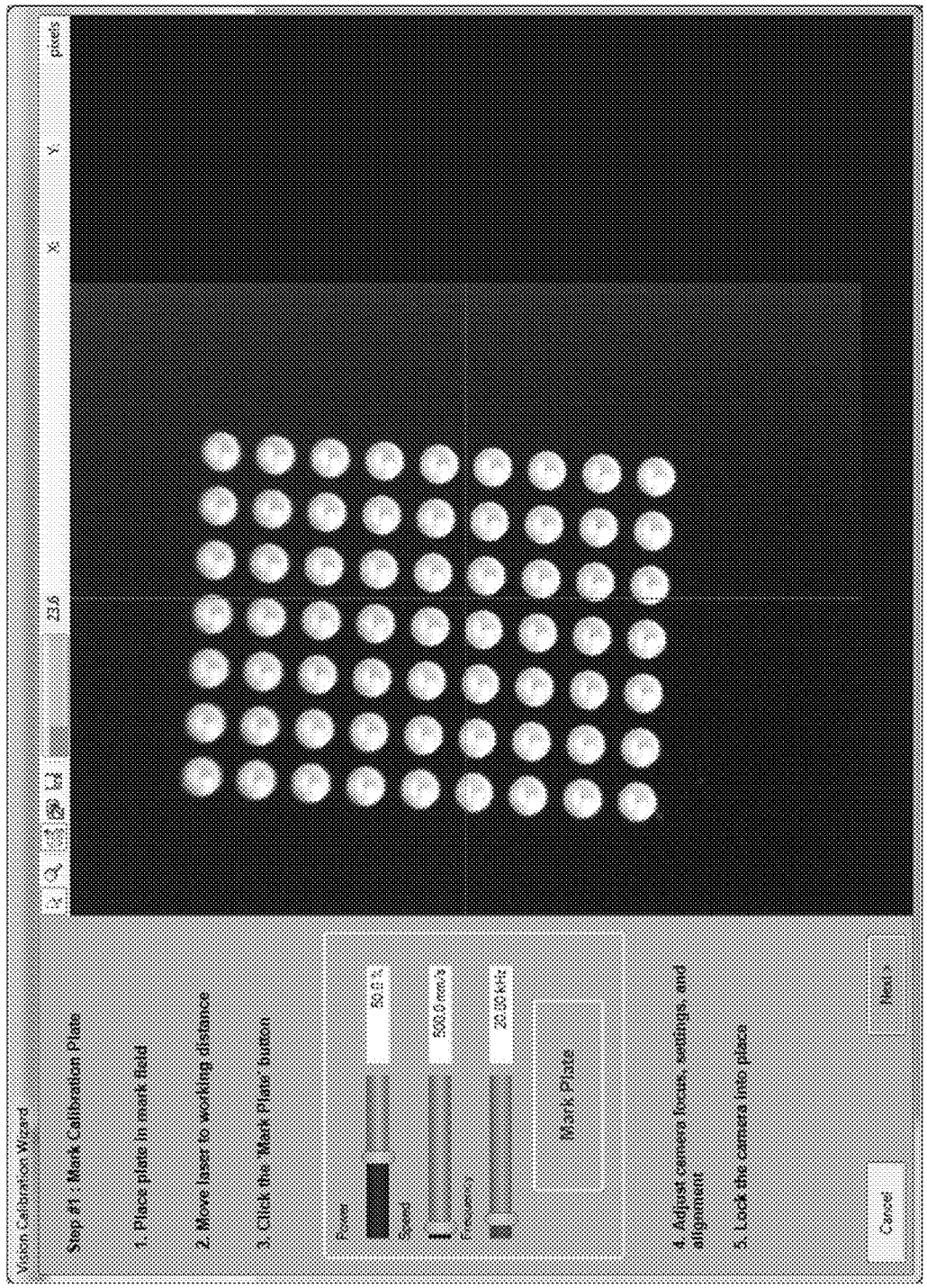
FIGS. 8A-8F are screen shots illustrating steps in the method of FIG. 7.

A first series of acts in the method involve marking a calibration plate to form a pre-defined calibration pattern on a flat surface (FIG. 8A). These acts include moving the galvo mirrors 124A and 124B into a home position (arbitrary X, Y co-ordinates 0,0), placing an unmarked calibration plate (for example, a metal plate) onto the stage of the laser marking system, and moving the stage into a marking position (a working distance of the laser) if not already in the marking position. The mark parameter settings, for example, laser intensity and marking speed are adjusted based on, for example, a material of the marking plate. A calibration pattern, for example, an array of dots is then laser marked onto the calibration plate. Camera parameters, for example, focus, gain and/or alignment and lighting parameters, for example, brightness are adjusted as needed so that the marked calibration pattern is clearly visible to the camera of the laser marking system.

Figure 8B:
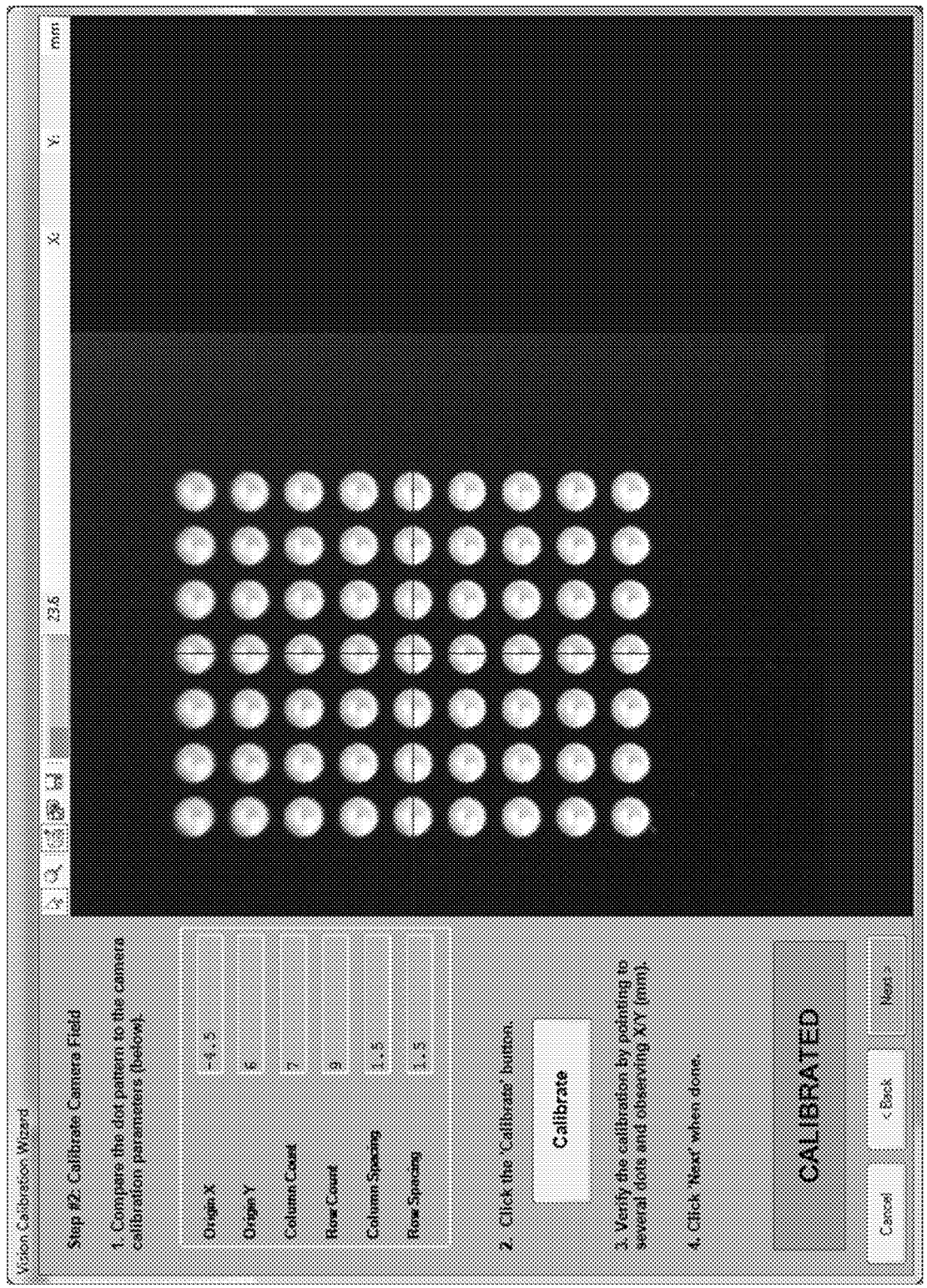

Next, camera calibration at the center of the marking field is generated. An operator instructs the laser marking system to perform a calibration operation and the system creates an indicator, for example, a cross-hair superimposed on an image of the calibration plate on a display of the system, and adjusts the location of the indicator to indicate the calibrated image origin. (FIG. 8B.) The user may indicate different locations or marks on the calibration plate to confirm that the indicator reliably moves to the position indicated to verify the initial calibration. If the indicator does not reliably track the indications provided by the user, the mark parameters and/or camera and lighting parameters may be adjusted and the initial calibration re-performed. From the initial calibration, the system generates and records a data file including parameters used to convert between camera pixels and real-world millimeters in the marking plane and another data file defining the angle between the camera and the marking field.

Figure 8C:
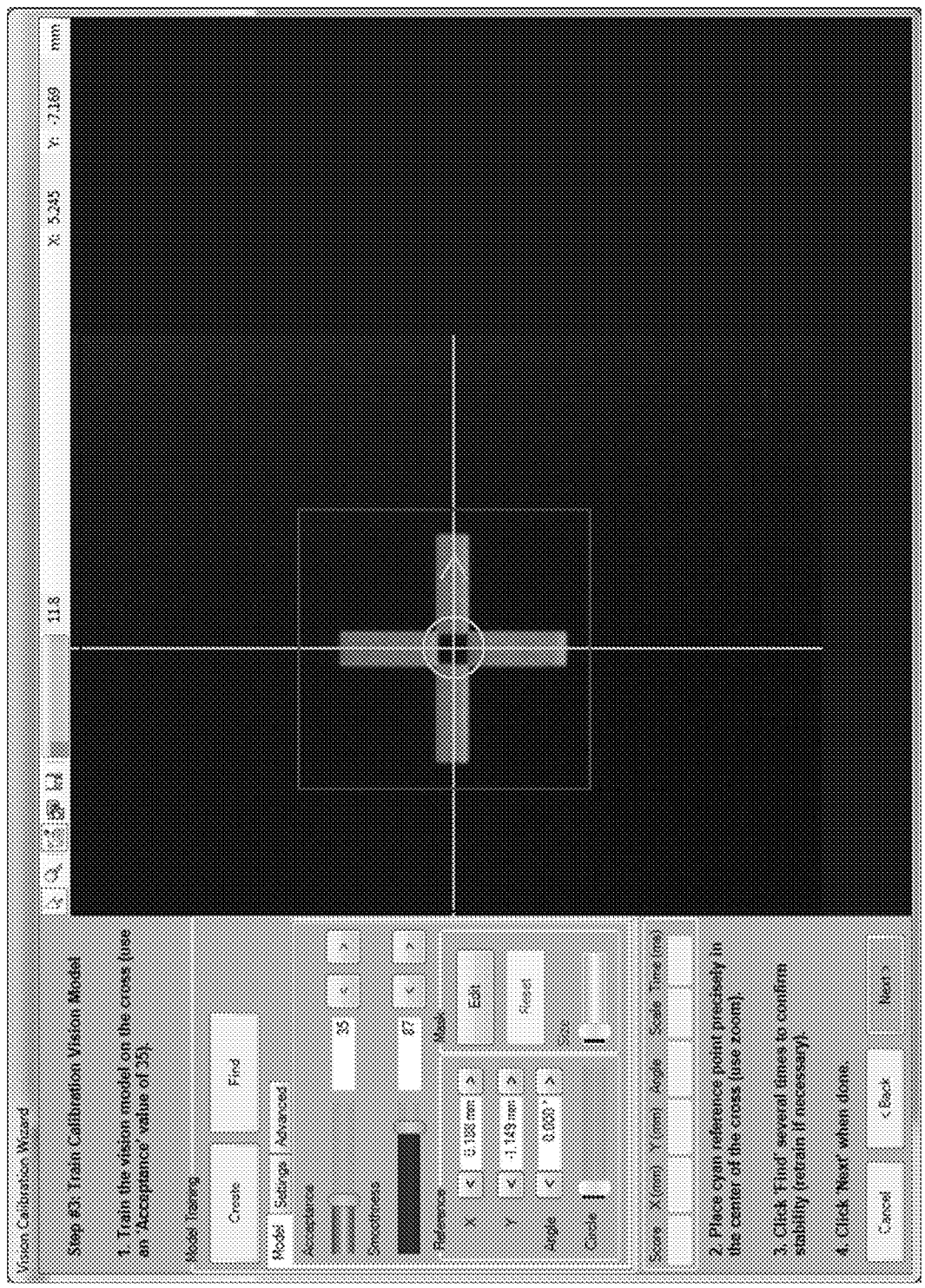

In a next set of acts a calibration indicator, for example, a calibration cross shape for camera-to-laser calibration is trained. The calibration cross is a feature that had previously been marked on the calibration plate, for example, at coordinates (25, 0). An image of one of the calibration crosses on the marked calibration plate is displayed in a display of the system. (FIG. 8C.) A user defines the size and shape of the calibration cross by adjusting the size of a training box superimposed on the image of the calibration cross and by defining the center point of the calibration cross using a cross-hair or other indicator. The user instructs the system to generate a vision model based on the defined size and location of the calibration cross. The user may confirm the stability of the model training by instructing the system to find the calibration cross several times and verify that the system finds and displays the calibration cross in the proper location in the display.

Figure 8D:
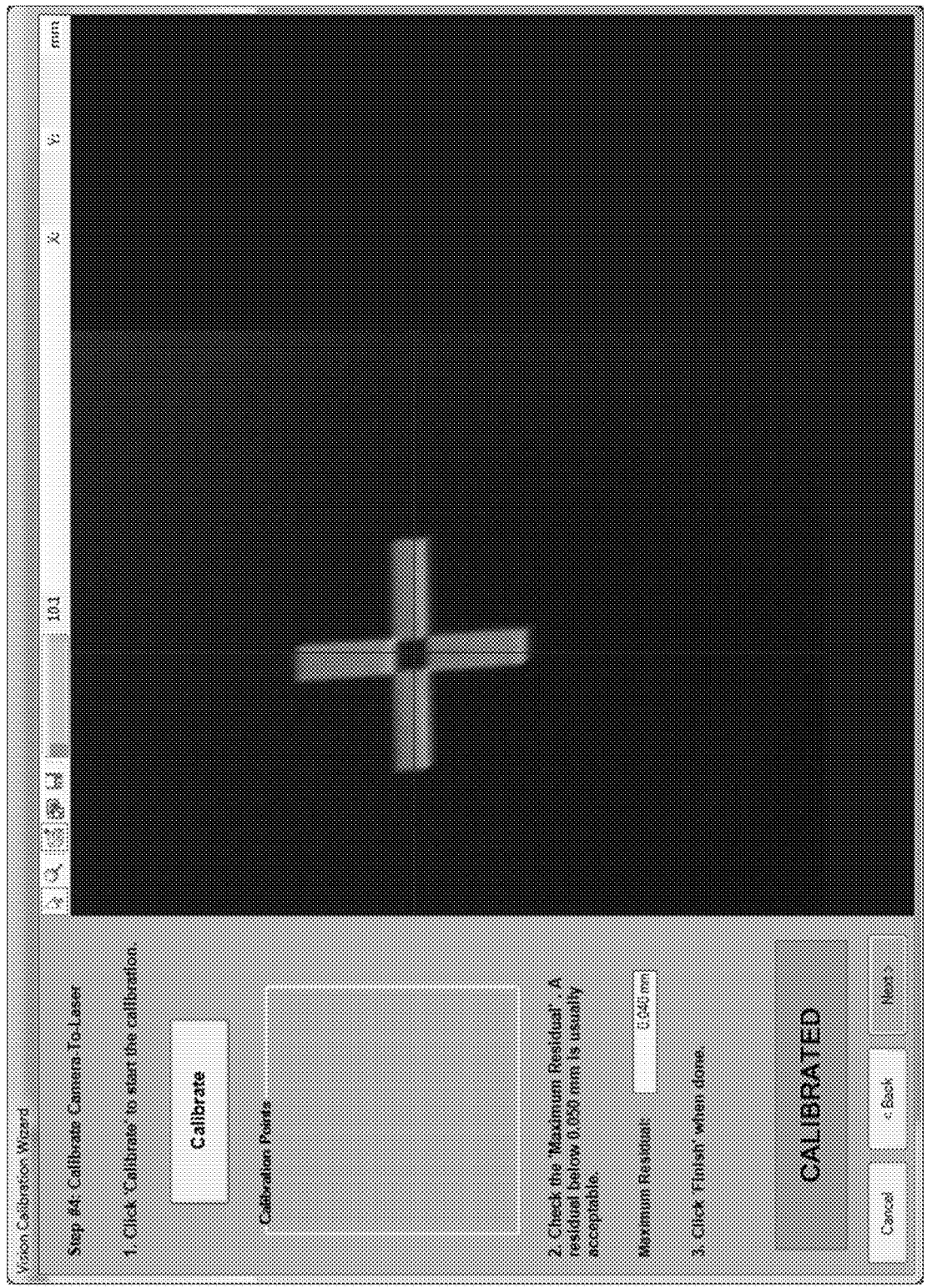

A camera-to-laser field calibration is then performed in which a correction for lens distortion across the entire laser marking field is generated. The user instructs the laser marking system to perform the camera-to-laser field calibration by pressing an appropriate button on the user interface of the system, for example, a "Calibrate" button. The system moves the laser galvo mirrors to each of the calibration cross locations on the marking plate, for example, 24 different calibration cross positions. At each galvo position, the system camera captures an image (FIG. 8D) and determines the precise location of each calibration cross. Based on the determined locations of each of the calibration crosses, the system generates and records a polynomial equation defining differences between expected and actual galvo positions at which the calibration crosses were located that allows accurate imaging across the marking field. The maximum "residual" indicating the least accurate calibration point is calculated and is checked to ensure it is not greater than a predefined maximum value, typically 0.050 mm or less.

Figure 8E:
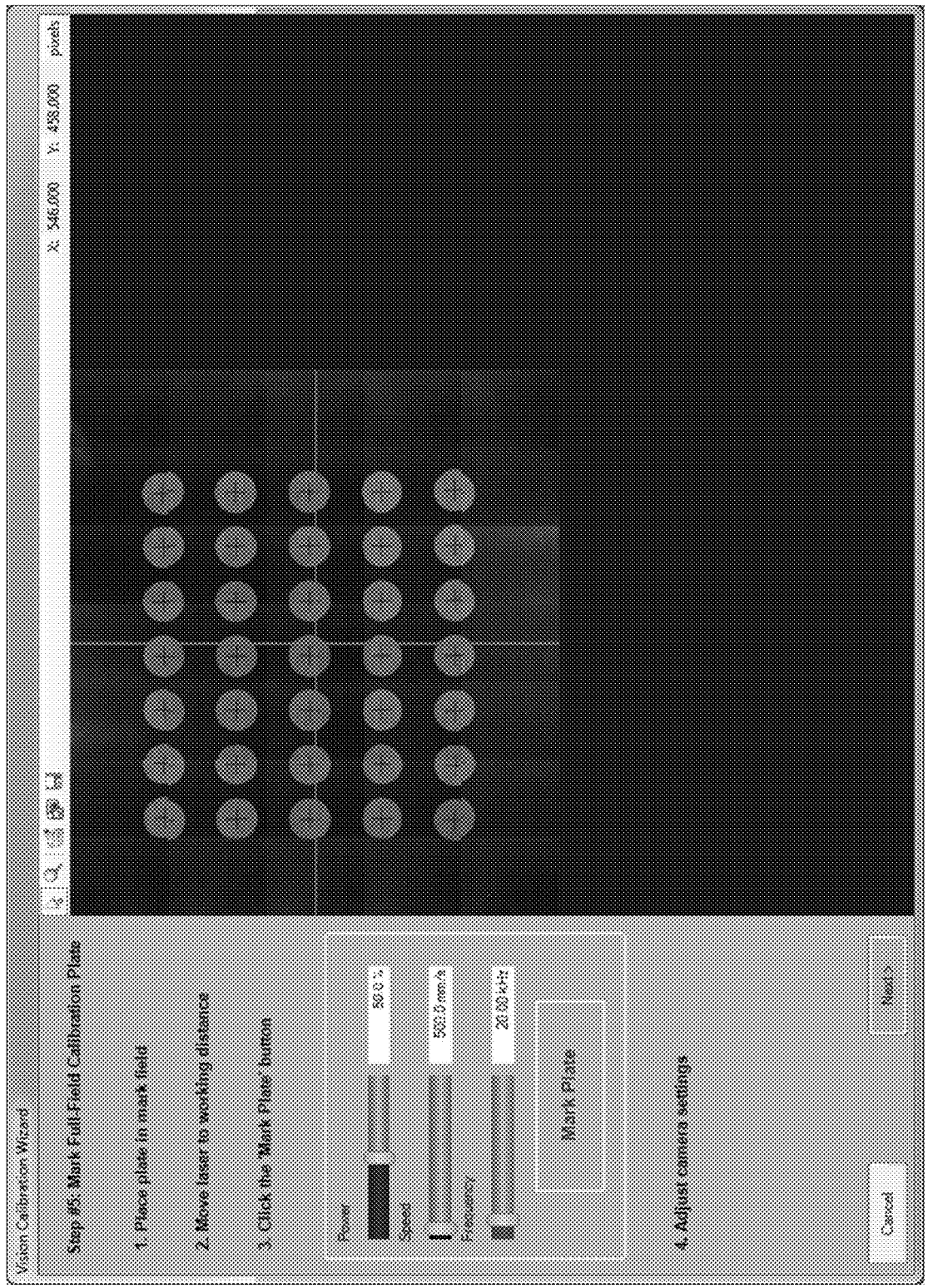
Figure 8F:
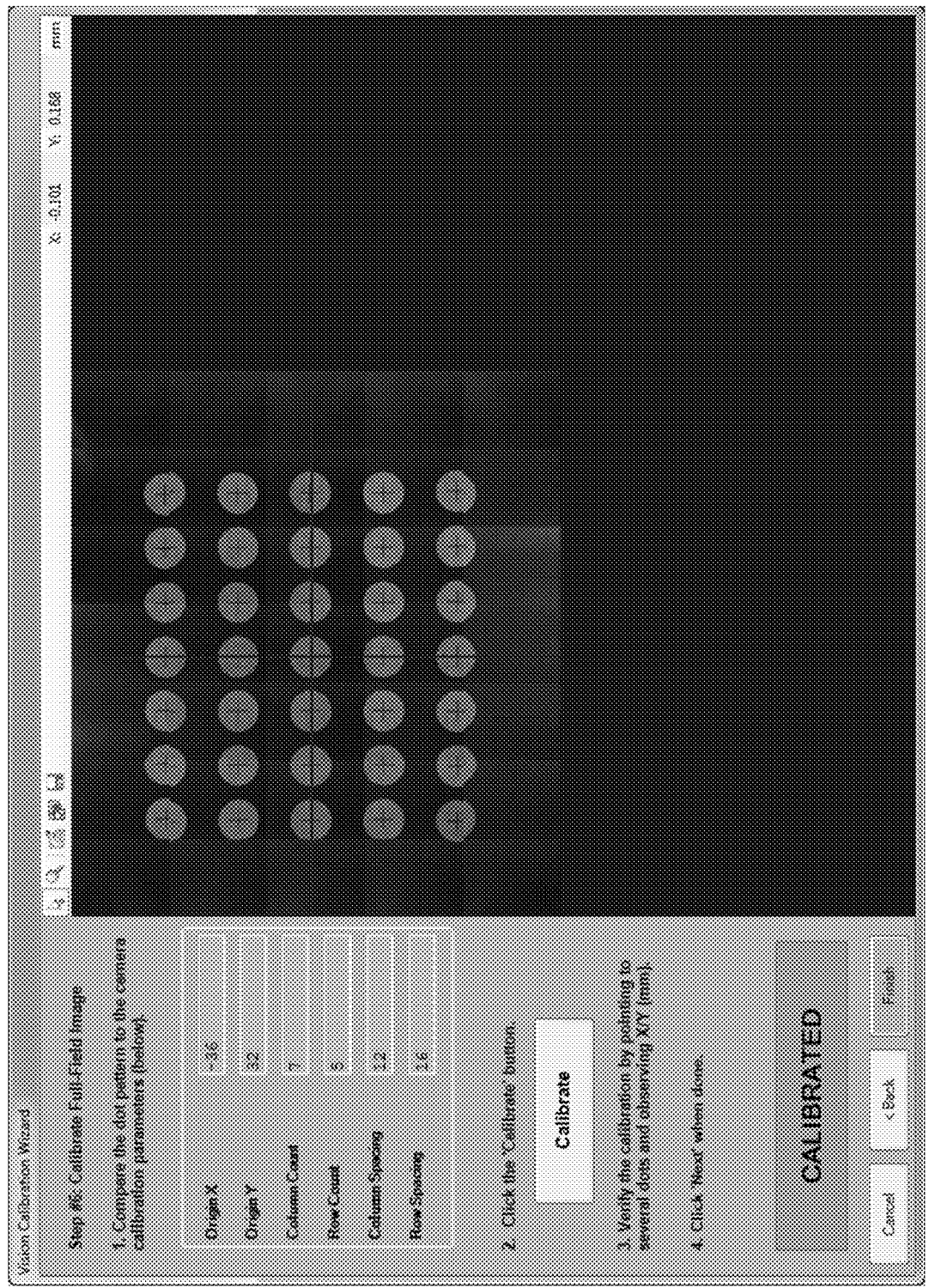

A full-field calibration plate is then marked. An unmarked plate is placed in the laser marking field and the plate and/or laser position is adjusted as needed to place the plate at the laser working distance (the laser focus distance). Mark parameter settings are adjusted as needed and the calibration plate is marked, for example, with an array of dots. The camera and lighting settings are adjusted so that the dots are clearly visible (FIG. 8E).

A full field-image calibration is then generated. The user instructs the system to perform the full-field calibration by selecting a "Calibrate" button or other command indicator in the user interface of the system. A laser target indicator, for example, a cross hair is superimposed over an image of the marked calibration plate in a display of the system. The system adjusts a position of the cross-hair to indicate the calibrated image origin. The user may check the calibration accuracy by using a mouse or other pointing device to select different locations on the image of the marked calibration plate and checking that the laser target indicator reliably moves to the selected locations. From the full-field image calibration the system generates and records a data file for conversion between full-field image pixels and real-world millimeters in the laser marking system marking plane.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. It is to be appreciated that embodiments of the methods and apparatuses discussed herein are not limited in application to the details of construction, dimensions, or the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. Accordingly, the foregoing description and drawings are by way of example only.

What is claimed is:

1. A laser marking system comprising:
   a laser;
   a camera having a field of view (FOV);
   a marking head including electromagnetic energy deflectors and at least one lens, a beam path of the laser and a beam path of the camera both passing through the at least one lens; and
   a computer system operable to perform a method of marking a workpiece comprising:
      adjusting the electromagnetic energy deflectors to direct the beam path of the camera to multiple different locations within a marking field of the laser marking system, the marking field having an entirety greater than the camera FOV;
      capturing, with the camera, an image tile at each of the multiple different locations, thus providing a plurality of captured image tiles, each captured image tile spanning the FOV of the camera;
      stitching together the plurality of captured image tiles to produce a composite image of the entirety of the marking field;
      using the composite image of the entirety of the marking field to identify a location and orientation of an image of the workpiece within the marking field;
      determining a location and orientation of a mark to be applied to the workpiece based on the identified location and orientation of the image of the workpiece within the composite image of the entirety of the marking field; and
      applying the mark to the workpiece at the determined location and orientation with the laser, including using an autofocus module of the computer system to perform an autofocus procedure to compensate for a difference in the beam path of the camera and the beam path of the laser, wherein the computer system causes a focus point of the marking laser to match a focus point of the camera for the captured image tile at each of the multiple different locations.

2. The laser marking system of claim 1, wherein the computer system is operable to identify the location and orientation of the image of the workpiece within the composite image of the marking field by applying an image model of the workpiece to the composite image.

3. The laser marking system of claim 2, wherein the computer system is further operable to create the image model from a composite image of the marking field including an image of a master workpiece.

4. The laser marking system of claim 2, wherein the computer system is further operable to identify a location of one or more additional features of the image of the workpiece utilizing one or more additional feature models.

5. The laser marking system of claim 4, wherein the one or more additional feature models include Multi Model Registration feature models.

6. The laser marking system of claim 1, wherein the computer system is further operable to identify locations and orientations of images of multiple different types of workpieces within the composite image of the marking field and to mark the multiple different types of workpieces with the laser in a single run.

7. The laser marking system of claim 1, wherein the computer system is operable to identify the location and orientation of the image of the workpiece within the composite image of the marking field without the workpiece being held in a fixture.

8. The laser marking system of claim 1, wherein the computer system is operable to identify the location and orientation of the image of a workpiece having dimensions greater than the field of view of the camera within the composite image of the marking field.

9. The laser marking system of claim 1, further comprising a dichroic mirror disposed in both the beam path of the laser and the beam path of the camera.

10. The laser marking system of claim 9, wherein the laser is configured to produce a laser beam at a frequency at which the dichroic mirror is substantially transparent.

11. A method of laser marking a workpiece with a laser marking system, the laser marking system comprising a laser having a laser beam path, a camera having a field of view (FOV) and a camera beam path, electromagnetic energy deflectors to direct the beam path of the camera, and at least one lens, the laser beam path and the camera beam path both passing through the at least one lens, the method comprising:
   directing the camera beam path with the electromagnetic energy deflectors to multiple different locations within a marking field of the laser marking system, the marking field having an entirety greater than the camera FOV;
   capturing, with the camera, an image tile at each of the multiple different locations, thus providing a plurality of captured image tiles, each captured image tile spanning the FOV of the camera;

stitching together the plurality of captured image tiles to produce a composite image of the entirety of the marking field;

using the composite image of the entirety of the marking field to identify a location and orientation of an image of the workpiece within the marking field;

determining a location and orientation of a mark to be applied to the workpiece based on the identified location and orientation of the image of the workpiece within the composite image of the entirety of the marking field; and applying the mark to the workpiece at the determined location and orientation with the laser, including using an autofocus module of the laser marking system to perform an autofocus procedure to compensate for a difference in the beam path of the camera and the beam path of the laser, wherein the laser marking system causes a focus point of the marking laser to match a focus point of the camera for the captured image tile at each of the multiple different locations.

12. The method of claim 11, further comprising directing the beam path of the camera and a laser beam produced by the laser through a common lens in a marking head of the laser marking system.

13. The method of claim 11, wherein the identifying the location and orientation of the image of the workpiece within the composite image of the marking field is performed without the workpiece being held in a fixture.

14. The system of claim 1, wherein the computer system is further operable to perform a method of identifying a region of interest on the workpiece within the composite image of the marking field.

15. The method of claim 11, further comprising identifying a region of interest on the workpiece within the composite image of the marking field.

16. The system of claim 1, wherein the image tile at each of the multiple different locations is captured by only the camera arranged internal to the laser marking system.

17. The method of claim 11, wherein in the capturing, the image tile at each of the multiple different locations is captured by only the camera arranged internal to the laser marking system.

18. The system of claim 1, wherein the camera is embedded in the marking head.

19. The method of claim 11, wherein the camera is embedded in the laser marking system.

20. The system of claim 1, wherein the electromagnetic energy deflectors comprise galvo mirrors.

21. The laser marking system of claim 20, wherein the camera consists of a single camera.

22. The method of claim 11, wherein the identifying the location and orientation of the image of the workpiece within the composite image of the marking field is performed by applying an image model of the workpiece to the composite image.

23. The method of claim 22, wherein the image model of the workpiece is based on a computer model of the workpiece or an image of a master workpiece.

24. The method of claim 22, further comprising creating the image model of the workpiece from the composite image of the marking field including an image of a master workpiece.

25. The method of claim 11, further comprising identifying a location of one or more additional features of the image of the workpiece utilizing one or more additional feature models.

26. The method of claim 25, further comprising refining the location and the orientation of the image of the workpiece based on the location of the one or more additional features, and determining the location and orientation of the mark to be applied to the workpiece is based on the refined location and orientation of the workpiece within the composite image of the marking field.

27. The method of claim 11, further comprising at least one of: (a) identifying locations and orientations of images of multiple different types of workpieces within the composite image of the marking field and marking the multiple different types of workpieces with the laser in a single run, or (b) seeking multiple of a same type of workpiece within the marking field and marking the multiple workpieces with the laser in a single run.

28. The method of claim 11, further comprising identifying locations and orientations of images of multiple different types of workpieces within the composite image of the marking field and marking the multiple different types of workpieces with the laser in a single run.

29. The laser marking system of claim 2, wherein the image model of the workpiece is based on a computer model of the workpiece or an image of a master workpiece.

30. The laser marking system of claim 4, wherein: the computer system is further operable to refine the location and orientation of the image of the workpiece based on the location of the one or more additional feature models, and the determining the location and orientation of the mark to be applied to the workpiece is based on the refined location and orientation of the workpiece within the composite image of the marking field.

31. The laser marking system of claim 6, wherein the computer system is further operable to seek multiple of a same type of workpiece within the marking field in order to mark the multiple workpieces with the laser in a single run.

32. A laser marking system comprising:

a laser;

a camera having a field of view (FOV);

a marking head including electromagnetic energy deflectors and at least one lens, a beam path of the laser and a beam path of the camera both passing through the at least one lens; and a computer system operable to perform a method of marking a workpiece comprising:

adjusting the electromagnetic energy deflectors to direct the beam path of the camera to multiple different locations within a marking field of the laser marking system, the marking field having an entirety greater than the camera FOV;

capturing, with the camera, an image tile at each of the multiple different locations, thus providing a plurality of captured image tiles, each captured image tile spanning the FOV of the camera;

stitching together the plurality of captured image tiles to produce a composite image of the entirety of the marking field;

using the composite image of the entirety of the marking field to identify a location and orientation of an image of the workpiece within the entirety of the marking field;

determining a location and orientation of a graphic to be applied to the workpiece based on comparing the location and orientation of the image of the workpiece within the composite image of the entirety of the marking field to a computer-based model of the workpiece, the computer-based model of the workpiece and the graphic positioned on the computer-based model relatively oriented to respectively aligned positions; and applying the graphic to the workpiece at the determined location and orientation with the laser to match the graphic positioned on the computer-based model of the workpiece, including using an autofocus module of the computer system to perform an autofocus procedure to compensate for a difference in the beam path of the camera and the beam path of the laser, wherein the computer system causes a focus point of the marking laser to match a focus point of the camera for the captured image tile at each of the multiple different locations.

33. A method of laser marking a workpiece with a laser marking system, the laser marking system comprising a laser having a laser beam path, a camera having a field of view (FOV) and a camera beam path, electromagnetic energy deflectors to direct the beam path of the camera, and at least one lens, the laser beam path and the camera beam path both passing through the at least one lens, the method comprising:

directing the camera beam path with the electromagnetic energy deflectors to multiple different locations within a marking field of the laser marking system, the marking field having an entirety greater than the camera FOV;

capturing, with the camera, an image tile at each of the multiple different locations, thus providing a plurality of captured image tiles, each captured image tile spanning the FOV of the camera;

stitching together the plurality of captured image tiles to produce a composite image of the entirety of the marking field;

using the composite image of the entirety of the marking field to identify a location and orientation of an image of the workpiece within the composite image of the marking field;

determining a location and orientation of a graphic to be applied to the workpiece based on comparing the location and orientation of the image of the workpiece within the composite image of the entirety of the marking field to a computer-based model of the workpiece, the computer-based model of the workpiece and the graphic positioned on the computer-based model relatively oriented to respectively aligned positions; and applying the graphic to the workpiece at the determined location and orientation with the laser of the marking system to match the graphic positioned on the computer-based model of the workpiece, including an autofocus module of the laser marking system to perform an autofocus procedure to compensate for a difference in the beam path of the camera and the beam path of the laser, wherein the laser marking system causes a focus point of the laser to match a focus point of the camera for the captured image tile at each of the multiple different locations.

* * * * *